United States Patent
Hamlin et al.

(10) Patent No.: US 9,219,704 B2
(45) Date of Patent: Dec. 22, 2015

(54) ORGANIZING MESSAGES INTO CONVERSATION THREADS

(75) Inventors: Drew W. Hamlin, San Francisco, CA (US); Daniel Hsiao, East Palo Alto, CA (US); Mark E. Zuckerberg, Palo Alto, CA (US); Andrew G. Bosworth, Palo Alto, CA (US); Joel Benjamin Seligstein, Mountain View, CA (US); Ross David Bayer, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/284,555

(22) Filed: Oct. 28, 2011

(65) Prior Publication Data
US 2012/0124147 A1    May 17, 2012

Related U.S. Application Data

(60) Provisional application No. 61/413,127, filed on Nov. 12, 2010.

(51) Int. Cl.
*G06F 15/16*    (2006.01)
*H04L 12/58*    (2006.01)
(Continued)

(52) U.S. Cl.
CPC ............... *H04L 51/36* (2013.01); *G06F 15/16* (2013.01); *G06F 15/18* (2013.01); *G06N 5/025* (2013.01)

(58) Field of Classification Search
CPC ...... G06Q 50/01; H04L 51/36; H04L 12/589; H04L 51/16; H04L 12/586; H04L 12/1813; H04L 12/1822

USPC .................................................. 709/204–206
See application file for complete search history.

(56) References Cited

U.S. PATENT DOCUMENTS

| | | | |
|---|---|---|---|
| 7,305,069 B1 | 12/2007 | Day | |
| 7,328,242 B1 | 2/2008 | McCarthy et al. | |
| 7,664,814 B2 | 2/2010 | Little, II | |

(Continued)

FOREIGN PATENT DOCUMENTS

| | | | |
|---|---|---|---|
| CN | 1791254 A | 6/2006 | |
| CN | 1917483 A | 2/2007 | |

(Continued)

OTHER PUBLICATIONS

PCT International Search Report and Written Opinion, PCT Application No. PCT/US2011/060035, May 18, 2012, nine pages.

(Continued)

*Primary Examiner* — Brian J Gillis
*Assistant Examiner* — Shean Tokuta
(74) *Attorney, Agent, or Firm* — Fenwick & West LLP

(57) ABSTRACT

A messaging system that organizes and presents messages to users of the messaging system. The messaging system includes a mailbox module that receives messages and generates conversation threads from the messages. Messages received from different electronic message channels may be aggregated into a common conversation thread. The conversation threads are also organized in a message interface and then presented to a user of the messaging system. The messaging system may include a social networking system that stores social information about users, which can be used to organize the conversation threads. Other features include a multi mode message interface, and a method for adding contextual information to messages.

12 Claims, 20 Drawing Sheets

(51) Int. Cl.
*G06F 15/18* (2006.01)
*G06N 5/02* (2006.01)

(56) References Cited

U.S. PATENT DOCUMENTS

| | | | |
|---|---|---|---|
| 7,752,275 B2 | 7/2010 | Malik | |
| 7,814,160 B2 | 10/2010 | Burtner et al. | |
| 8,223,940 B2 | 7/2012 | O'Shaughnessy et al. | |
| 8,706,824 B2 | 4/2014 | Davenport et al. | |
| 2002/0006793 A1 | 1/2002 | Kun-Szabo et al. | |
| 2002/0120697 A1 | 8/2002 | Generous et al. | |
| 2003/0046421 A1 | 3/2003 | Horvitz et al. | |
| 2003/0185379 A1* | 10/2003 | O'Connor et al. | 379/265.02 |
| 2004/0003042 A1 | 1/2004 | Horvitz et al. | |
| 2004/0203959 A1 | 10/2004 | Coombers | |
| 2006/0031329 A1 | 2/2006 | Robertson | |
| 2006/0053379 A1 | 3/2006 | Henderson et al. | |
| 2006/0059160 A1* | 3/2006 | Smola et al. | 707/10 |
| 2006/0173824 A1 | 8/2006 | Bensky et al. | |
| 2007/0005654 A1 | 1/2007 | Schachar et al. | |
| 2007/0005713 A1 | 1/2007 | Levasseur et al. | |
| 2007/0143428 A1* | 6/2007 | Kumar et al. | 709/206 |
| 2007/0185961 A1 | 8/2007 | Perlow et al. | |
| 2007/0198648 A1* | 8/2007 | Allen et al. | 709/207 |
| 2007/0226628 A1* | 9/2007 | Schlack | 715/733 |
| 2007/0280439 A1 | 12/2007 | Prywes | |
| 2008/0019353 A1* | 1/2008 | Foote | 370/352 |
| 2008/0028031 A1 | 1/2008 | Bailey et al. | |
| 2008/0028251 A1 | 1/2008 | Komaki et al. | |
| 2008/0182548 A1 | 7/2008 | Pattison et al. | |
| 2008/0182559 A1 | 7/2008 | Pyhalammi et al. | |
| 2008/0215694 A1 | 9/2008 | Chen et al. | |
| 2008/0222256 A1 | 9/2008 | Rosenberg et al. | |
| 2008/0250332 A1 | 10/2008 | Farrell et al. | |
| 2008/0250335 A1 | 10/2008 | Gusler et al. | |
| 2008/0294735 A1 | 11/2008 | Muntermann et al. | |
| 2009/0031232 A1 | 1/2009 | Brezina et al. | |
| 2009/0031244 A1* | 1/2009 | Brezina et al. | 715/781 |
| 2009/0112871 A1* | 4/2009 | Hawthorne et al. | 707/9 |
| 2009/0119167 A1 | 5/2009 | Kendall et al. | |
| 2009/0125462 A1 | 5/2009 | Krishnaswamy et al. | |
| 2009/0150507 A1 | 6/2009 | Davis et al. | |
| 2010/0017492 A1 | 1/2010 | Reistad | |
| 2010/0131858 A1 | 5/2010 | Schultz et al. | |
| 2010/0223341 A1 | 9/2010 | Manolescu et al. | |
| 2010/0257241 A1 | 10/2010 | Hale et al. | |
| 2010/0306185 A1* | 12/2010 | Smith et al. | 707/709 |
| 2010/0318571 A1 | 12/2010 | Pearlman et al. | |
| 2011/0029647 A1 | 2/2011 | Ginevan et al. | |
| 2011/0029923 A1 | 2/2011 | Xu et al. | |
| 2011/0038287 A1 | 2/2011 | Agarwal et al. | |
| 2011/0041082 A1 | 2/2011 | Nguyen | |
| 2011/0055309 A1 | 3/2011 | Gibor et al. | |
| 2011/0082906 A1 | 4/2011 | Kreig et al. | |
| 2011/0116610 A1 | 5/2011 | Shaw et al. | |
| 2011/0173260 A1 | 7/2011 | Biehl et al. | |
| 2011/0173553 A1* | 7/2011 | Karmon et al. | 715/767 |
| 2011/0179126 A1 | 7/2011 | Wetherell et al. | |
| 2011/0263278 A1* | 10/2011 | Riddle et al. | 455/466 |
| 2011/0264737 A1* | 10/2011 | Skinner | 709/204 |
| 2011/0302250 A1 | 12/2011 | Plotts et al. | |
| 2012/0054132 A1 | 3/2012 | Aberdeen et al. | |
| 2012/0054288 A1 | 3/2012 | Wiese et al. | |
| 2012/0110085 A1* | 5/2012 | Malik et al. | 709/205 |
| 2012/0124146 A1 | 5/2012 | Hsiao et al. | |
| 2012/0131474 A1 | 5/2012 | Panchadsaram et al. | |
| 2012/0265824 A1 | 10/2012 | Lawbaugh | |

FOREIGN PATENT DOCUMENTS

| | | |
|---|---|---|
| CN | 101064747 A | 10/2007 |
| CN | 101322147 A | 12/2008 |

OTHER PUBLICATIONS

PCT International Search Report and Written Opinion, PCT Application No. PCT/US2011/060032, Mar. 23, 2012, ten pages.

U.S. Appl. No. 12/913,701, filed Oct. 27, 2010.

McHood, J., "Top 5 Twitter Tips for Loan Officers," *Mortgage Loan Place*, May 10, 2009, two pages. [Online] [Retrieved Aug. 19, 2013] Retrieved from the Internet URL:http://www.mortgageloanplace.com/twitter.html.

Siegler, M.G., "Twitter Pumps Up Follower Email Notifications Further With Social Graph Juice," Aug. 26, 2010, two pages. [Online] [Retrieved Aug. 19, 2013] Retrieved from the Internet <URL:http://techcrunch.com/2010/08/26/twitter-email-notifications/.>.

Traction, "Amount of Ancestral Context to Include with Comments in Email Notifications," Mar. 22, 2008, four pages. [Online] [Retrieved Aug. 19, 2013] Retrieved from the Internet <URL:http://support.tractionsoftware.com/traction/page/Doc/Amount%20of%20Ancestral%20Context%20to%20with%20Comments%20in%20Email%20Notifications.>.

State Intellectual Property Office of the People's Republic of China, First Office Action, Chinese Patent Application No. 2011800599991, Feb. 27, 2015, sixteen pages.

\* cited by examiner

FIG. 5

From: Matthew Short <matthew.short@socialnetwork.com>
Subject:
Date: July 15, 2009 10:43 PM PST
To: Drew Hamlin

Matthew Short —1206
Slept in a little, leaving now for the train. —1208
I think it gets there around 11:30

—1207

Conversation History

Matthew Short                                                     Yesterday
sweet
ill let you know what time I leave tommorow am then

Drew Hamlin                                                     Yesterday
definitely!

Matthew Short                                                     Yesterday
So I'm thinking about coming up to look at apartments tomorrow
Just wondering if you'd be around to hang out View Conversation —1220

From: Josh Hayward <josh.hayward@socialnetwork.com>
Subject: July 15, 2009 10:43 PM PST
To: Drew Hamlin
Reply To: Conversation on Social Network <fb43z75dn@socialnetwork.com>

Conversation with Joey Flynn, Laurentius Leonardo Hartomo, Josh Hayward, Kaisha Hom, Terry Y. Liu, Francis Luu, Benjamin K. Shown, Tanya Test and Ronald Viernes — 1305

Joey Flynn
I'd look at Serifa (Adrian Frutiger). I also think that Caelia is pretty nice.

Conversation History — 1310

Ronald Paul Viernes — Yesterday
Http://typophile.com/node/49556

Drew Hamlin — Yesterday
Caelia is cool. It's not new but it does have a nice feel I think.

Josh Hayward — Yesterday
Hey guys I'm looking for a good slab serif.

— 1315

[ View Conversation ] — 1320

FIG. 13

ORGANIZING MESSAGES INTO CONVERSATION THREADS

CROSS-REFERENCE TO RELATED APPLICATION(S)

This application claims priority under 35 U.S.C. §119(e) to U.S. Provisional Patent Application Ser. No. 61/413,127, "Messaging System," filed Nov. 12, 2010. The subject matter of all of the foregoing is incorporated herein by reference in their entirety.

FIELD OF THE INVENTION

The present disclosure relates generally to messaging systems, and more specifically to a messaging system that organizes messages into conversation threads.

BACKGROUND

People communicate with each other in an online environment by sending and receiving messages. One area in which large numbers of messages are involved is in social networking Social networking systems allow users to form relationships with other users, applications, events, and many other objects. Users can then communicate with other users in the social network by sending messages such as electronic mail ("email") and web-chat messages. When large numbers of messages are involved, whether it be in a social networking system or otherwise, it is easy for a user to become overwhelmed with a constant stream of incoming messages. Thus, it has become a challenge to organize and present messages to users in a manner that is both efficient and user-friendly.

SUMMARY

The present invention generally relates to various aspects of a messaging system. Embodiments of the present invention include a mailbox module for organizing and presenting messages to a user of the messaging system by aggregating messages between a set of users into continuous conversation threads. In some embodiments, the messaging system may also be a social networking system.

In one embodiment, the mailbox module aggregates messages from different messaging channels into conversation threads. A first message is received via a first electronic message channel (e.g., email). A second message is received via a second electronic message channel (e.g., web-chat) that is different than the first electronic message channel. Both messages are associated with the same set of users of the messaging system. For example, the first message may be sent by user A to user B and user C, and the second message may be sent by user B to user A and user C. Both of these messages are considered to be associated with user A, user B and user C. Both messages are added to the same conversation thread that is associated with the set of users and includes a collection of messages previously sent between the users of the thread. The conversation thread can be presented for display to one of the users of the thread, resulting in a seamless messaging experience that integrates different messages into conversation threads regardless of the messaging channel associated with the message.

In another embodiment, the mailbox module includes a message interface for sending messages that operates in different message modes. The mailbox module presents the messages of a conversation thread in one region of the interface and a text entry element in another region of the interface. The text entry element accepts message text for updating the conversation thread with a new message. The text entry element operates in at least two different modes. In one mode, pressing the keyboard return key sends the message text in the text entry element as a message. In another mode, pressing the keyboard return key does not send the message, but instead opens an additional line of text in the text entry element. A mode selection element is also presented in the interface that allows the user to switch between the supported message modes.

In another embodiment, the mailbox module organizes conversation threads according to social information that is indicative of social relationships between the participants of a thread. The mailbox module maintains a plurality of conversation threads. Each conversation thread is associated with different plurality of participants that are also users of a social networking system. For example, one thread may be for messages sent between user A and user B. Another thread may be for messages sent between user A and user C. The mailbox module generates a message interface with folders for grouping of the conversation threads. At least one conversation thread is placed into a folder based on social information (e.g., social affinity, relationship degrees, existence of a relationship, etc) about a social relationship between the participants of the thread. The message interface is then presented for display to a participant of the thread. Thus, by using social information to organize conversation threads into folders, conversations can be grouped together based on their perceived social relevance.

In a further embodiment, the mailbox module adds contextual information to a message before delivering a message notification to a recipient of the message. The mailbox module receives a message associated with a plurality of users of a messaging system. A set of messages that were previously sent between the users is identified. From these messages, a subset of recent messages is identified. The subset of messages include messages that are more recent than other messages in the set. For each message, additional contextual information such as a profile picture or profile link for the user that sent the message is identified and associated with the content of the message. A message notification is generated that organizes the associated message contents and profile pictures in chronological order. The message notification is then delivered for display to one or more of the users associated with the original message.

BRIEF DESCRIPTION OF THE DRAWINGS

FIG. 5 is message interface for a conversation thread between more than two users, according to an embodiment.

FIG. 12 is an email message with added contextual information, according to an embodiment.

FIG. 13 is an email message with added contextual information, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
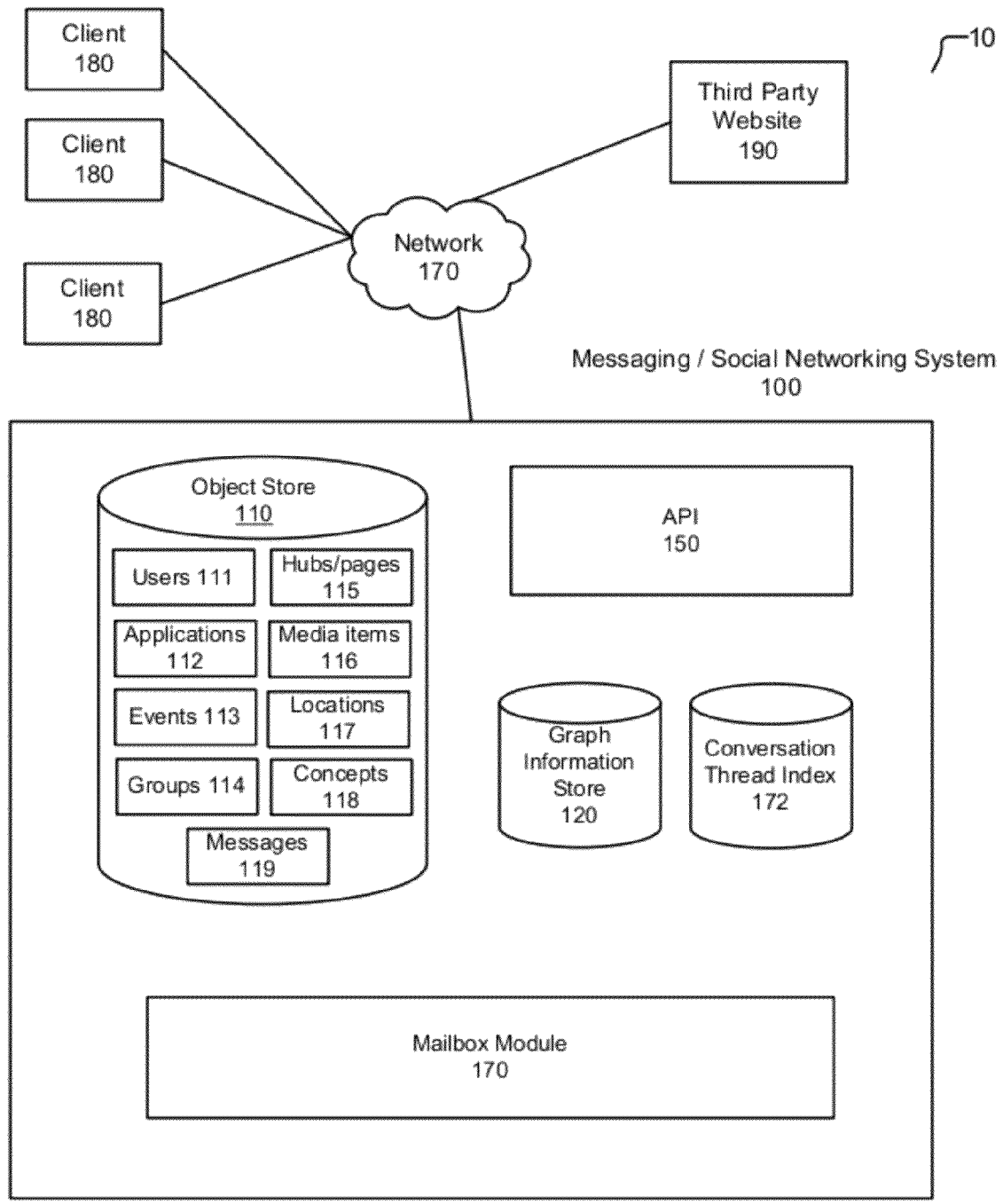
FIG. 1 is a high-level block diagram of a messaging system according to an embodiment.

FIG. 1 is a high-level block diagram of a computing environment 10 for messaging according to one embodiment. The computing environment 10 includes a messaging system 100, multiple client devices 180, and a third party website 190 connected by a network 170. In one embodiment, the messaging system 100, client devices 180, and third party website 190 each comprise of one or more computers. Additionally, the client devices 180 may comprise any other type of computing device, such as a mobile phone, laptop, netbook, tablet, cable box, television, etc.

A user of the messaging system 100 uses the client device 180 to interact with the messaging system 100 via an application, such as a web browser or a native application, to perform operations such as browsing content, posting and sending messages, retrieving and sorting messages received from other users, and the like. The application may load a message interface provided by the messaging system 100, which is used for sending and receiving messages. Messages can be sent or received through different electronic message channels/formats. Generally speaking, a messaging channel is any technology that may be used for delivering electronic messages to a user of the messaging system. Examples of messaging channels include web-chat (e.g., a chat application of a web-page hosted by the messaging system 100), e-mail, extensible messaging and presence protocol (XMPP), short message service (SMS) texting and mobile chat (e.g., via an application installed on a mobile client 180). Messages can contain plain text, or they can contain other content such as pictures, videos, and attachments.

In one embodiment, the messaging system 100 is also a social networking system. The social networking system 100 comprises an object store 110, a graph information store 120, an application programming interface (API) 150, a conversation thread index 172, and a mailbox module 170. Through the API 150, a third party website 190 can interact with the social networking system 100. For example, the third party website 190 can perform operations supported by the API 150, such as delivering messages to the social networking system 100, retrieving messages stored by the social networking system 100, and obtaining social information about users of the social networking system 100.

The object store 110 stores information on various objects, such as users 111, tracked by the social networking system 100. These objects may represent a variety of things with which a user 111 may interact in the social networking system 100, including, without limitation, other users 111 of the social networking system (represented, e.g., as a profile object for the user), applications 112 (e.g., a game playable within the social networking system), events 113 (e.g., a concert that users may attend), groups 114 to which users may belong, pages or hubs 115 (e.g., pages constituting a particular organization's presence on the system), items of media 116 (e.g., pictures, videos, audio, text, or any other type of media content), locations 117 associated with a user (e.g., "Santa Clara, Calif., USA"), and even concepts 118 or other terms (e.g., "Victorian literature"). An object in the object store 110 may represent an entity existing within the social networking system (e.g., an application 112 available on the social networking system), a virtual entity that exists outside the domain of the social networking system (e.g., a website), or a real-world entity (e.g., a sports team or a retail store). The object store 110 may further store objects representing other data routinely produced by users 111 of the social networking system 100, such as messages 119, status updates, photos, and videos.

The object store 110 may store all of the objects existing within the social networking system 100, such as messages 119, or the image data associated with an image media item 116. Alternatively, for virtual entities existing outside of the social networking system 100, the object store 110 may contain some form of pointer or reference to the entities, such as the uniform resource locator (URL) of an external media item 116. Additionally, the object store 110 may also store metadata associated with the objects, such as a name describing the object (e.g. "Charles Williams" for a person, "Birthday Reminder" for an application, or "Penguin Fanciers" for a group), an image representing the object (e.g., a user profile picture), one or more labels assigned to the object by users (e.g. the textual strings "game", "crime", and "strategy" for a strategy game application), or different email addresses of a user object (e.g., "jeremy1234@ gmail.com" and "jeremy1234@ yahoo.com"). Different types of objects may have different types of metadata, such as a set of associated users 111 for a group 114, a media type (e.g., "video") for a media item object 116, and a unique user ID and name tokens (e.g., separate first and last names "Charles" and "Williams") for a user object 111.

The graph information store 120 stores information on the relationships of the objects in the object store 110. In one embodiment, the graph information store 120 represents the objects of the object store 110 as nodes that are linked together in a "social graph." The graph information store 120 thus comprises information about the relationships between or among the objects, represented as the edges connecting the various object nodes. Various examples of edges in the social graph include: an edge between two user objects representing that the users are have a relationship in the social networking system (e.g., are friends, or have communicated, viewed the other's profile, or interacted in some way), an edge between a user object and an application object representing that the user has used the application, an edge between a user object and a group object representing that the user belongs to the group, and an edge between a user object and a page object representing that the user has viewed the page, to name just a few. For example, if one user establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge. Using a social graph, therefore, a social networking system may keep track of many different types of objects and edges (the interactions and connections among those objects), thereby maintaining an extremely rich store of socially relevant information.

In one embodiment, edges in the graph information store 120 have associated metadata, such as a label describing the type of relationship (e.g., "friend" as the label between two user objects, "family" as the label between brother and sister), or an affinity value quantifying the strength of the relationship. Affinity may be determined, for example, from positive and negative interactions between two objects. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

In one embodiment, the social networking system 100 adds information to the graph information store 120 in real time as it observes events taking place indicating relationships between the various objects, such as a user 111 interacting with an application 112. Alternatively and/or additionally, the graph information store 120 may be created based on existing stored information from which relationships can be inferred. For example, the friend list of a user 111 might indicate that the user has a friend relationship with another user, or the data for a group 114 might indicate that some set of users has a membership relationship with that group, and this information could be reflected in the graph information store 120.

The conversation thread index 172 stores information about a large number of "conversation threads". Each conversation thread is associated with a different set of users ("participants" of the thread) and includes a collection of messages sent between the participants of the conversation thread. For example, one conversation thread may include messages sent between user Adam and user Bob. Another conversation thread may include messages sent between user Bob and user Charlie. Another conversation thread may include messages sent between users Adam, Bob and Charlie. A conversation thread can thus be viewed as a historical record of correspondence between a given set of users. A conversation thread may be a historical record of substantially all correspondence sent via the messaging system 100 between a set of users, or alternatively, a conversation thread may be a record of less than all correspondence.

In one embodiment, the messages 119 are stored in the object store 110 and the conversation thread index 172 links each conversation thread to the messages 119 that are part of the conversation thread. As conversation threads can include many messages 119, each conversation thread may be linked to several different messages 119. Other information stored in the index 172 for each thread can include, for example, participants of the thread, a folder or category that the thread belongs to, a state of the thread, timestamps of the messages in the thread, an electronic message channel associated with each message, as well as other types of information that are appropriate for indexing.

The mailbox module 170 accesses the conversation thread index 172 to retrieve information about conversation threads, update information about conversation threads, and to generate new conversation threads. The mailbox module may also access the object store 110 and graph information store 120 to retrieve information about the objects of the social networking system 100. Additionally, the mailbox module 170 receives, organizes, and presents messages to/from users of the social networking system 100 via an interactive message interface. The message interface can be, for example, a webpage that is viewed by a user at a client device 180 with a web browser.

The functionality provided by the mailbox module 170 is described in greater detail in conjunction with FIGS. 2-20. Examples of the functionality provided by the mailbox module include organizing messages into conversation threads, a multi-mode reply interface, organizing conversation threads using social network information, conversation thread states, conversation thread searching, new message notification, New User Experience (NUX) setup bar, adding contextual information to messages, forwarding messages between conversation threads, and invitation based features, among others.

1. Organizing Messages into Conversations

In one embodiment, the mailbox module 170 aggregates messages into conversation threads that include messages sent between the participants of the conversation thread. For example, assume that Adam and Bob are users of the social networking system 100. If Adam sends a message to Bob, the mailbox module 170 creates a new Adam-Bob conversation thread in the conversation thread index 172 associated with Adam and Bob. Each time Adam sends a /new message to Bob, that new message is added to the existing Adam-Bob conversation thread. Similarly, each time Bob sends a new message to Adam, that new message is also added to the existing Adam-Bob conversation thread. A conversation thread thus becomes a historical record of correspondence between a set of users.

Organizing messages into conversation threads is in contrast to conventional messaging systems that group messages together based on the subject of the message. Furthermore, many conventional messaging systems separate outgoing messages and incoming messages by organizing them in separate folders (e.g., a "sent" folder and an "inbox" folder).

By contrast, each conversation thread can include both outgoing and incoming messages within the same conversation thread.

In one embodiment, the mailbox module 170 also aggregates messages of different electronic message formats received via different types of electronic message channels (e.g., email, short message service (SMS) text, web-chat) into conversation threads. Each conversation thread thus becomes a historical record of correspondence between a set of users regardless of the format of the messages. For example, if Adam sends an online chat message to Bob and also separately sends an email to Bob via the messaging system, the mailbox module 170 places both of these messages into the same conversation thread (i.e., the Adam-Bob thread). This allows a conversation between a set of participants to continue uninterrupted, even as the participants switch between different message channels across a single client device 180 or while switching from one client device 180 to another.

The participants of a conversation thread can include two users, or more than two users. For example, if Adam sends an email message to Bob and copies Charles, this message creates a new three-way conversation thread between Adam, Bob, and Charles. This three-way conversation thread is distinct from the one on one conversation between Adam and Bob that was created in the prior example. Messages in the Adam-Bob conversation thread are not included in the Adam-Bob-Charles conversation thread, and vice versa.

Figure 14:
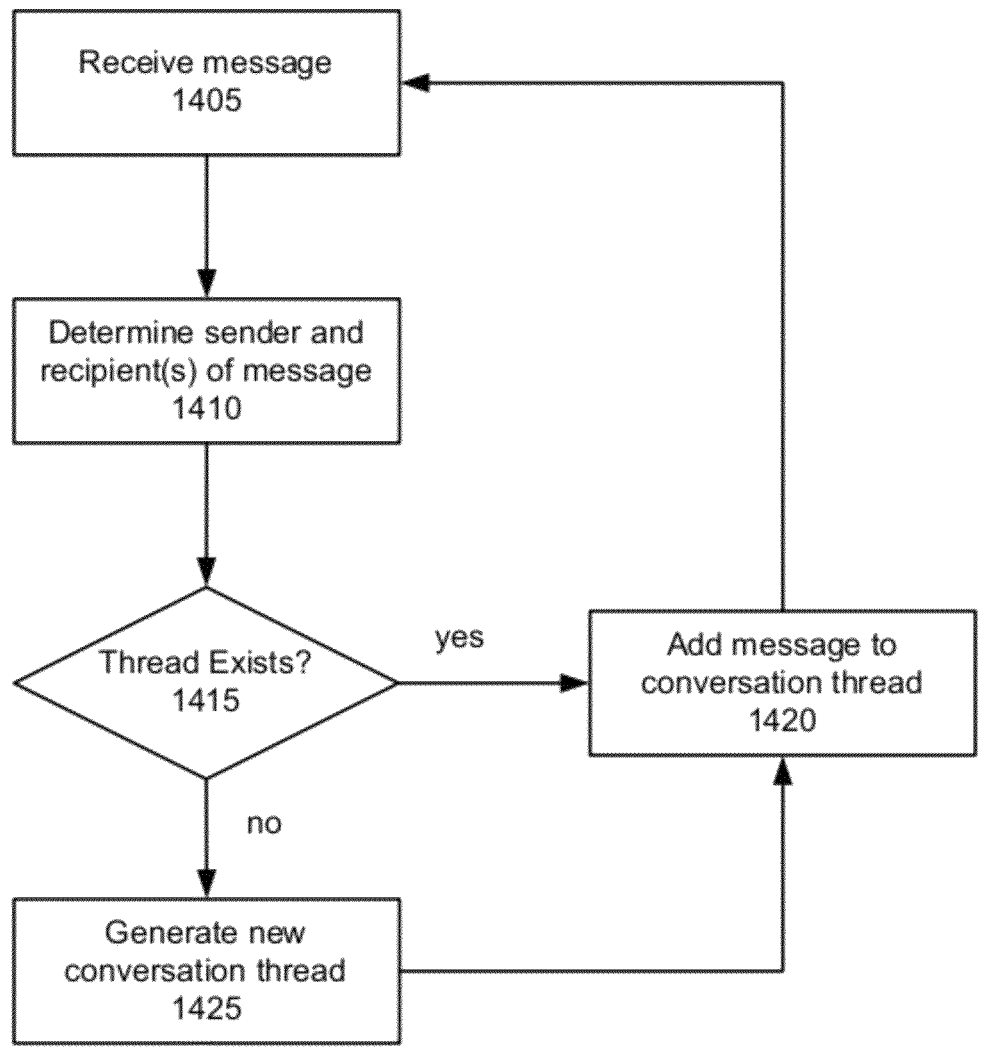
FIG. 14 is a method for organizing messages into conversation threads, according to an embodiment of the mailbox module.

FIG. 14 is a method for organizing messages into conversation threads, according to an embodiment of the mailbox module 170. In step 1405, the mailbox module 170 receives a message. The message may be received via any of a number of electronic message channels, such as email, web-chat, mobile-chat, or SMS text. Other electronic message channels are also possible. Messages typically have a sender that is a user of the messaging system and one or more recipients that are also a user of the messaging system. In step 1410, the mailbox module identifies the users of the messaging system that are the sender and recipient(s) of the message. In one embodiment, the object store 110 may store messaging information about its users that can be used to associate messages with users. For example, the object store may include information indicating that user Adam is associated with email address Adam@ mailserver.com and phone number 1-555-555-0100. This information may be used in some embodiments by the mailbox module 170 to identify the user that is the sender or recipient of the message.

In step 1415, the mailbox module determines if a thread already exists for the message. For example, if the sender and recipient(s) of a message match the participants of an existing thread of the thread index 172, then the thread exists for that message. In step 1420, if the thread already exists, the message is added to that thread. In step 1425, if a thread does not yet exist, the mailbox module generates a new thread for the message. For example, a new thread can be generated by adding a new entry to the conversation thread index 172. The message is then added to the new thread. A large number of messages from different electronic message channels can be processed and combined in this manner to generate a large number of conversation threads.

Figure 2:
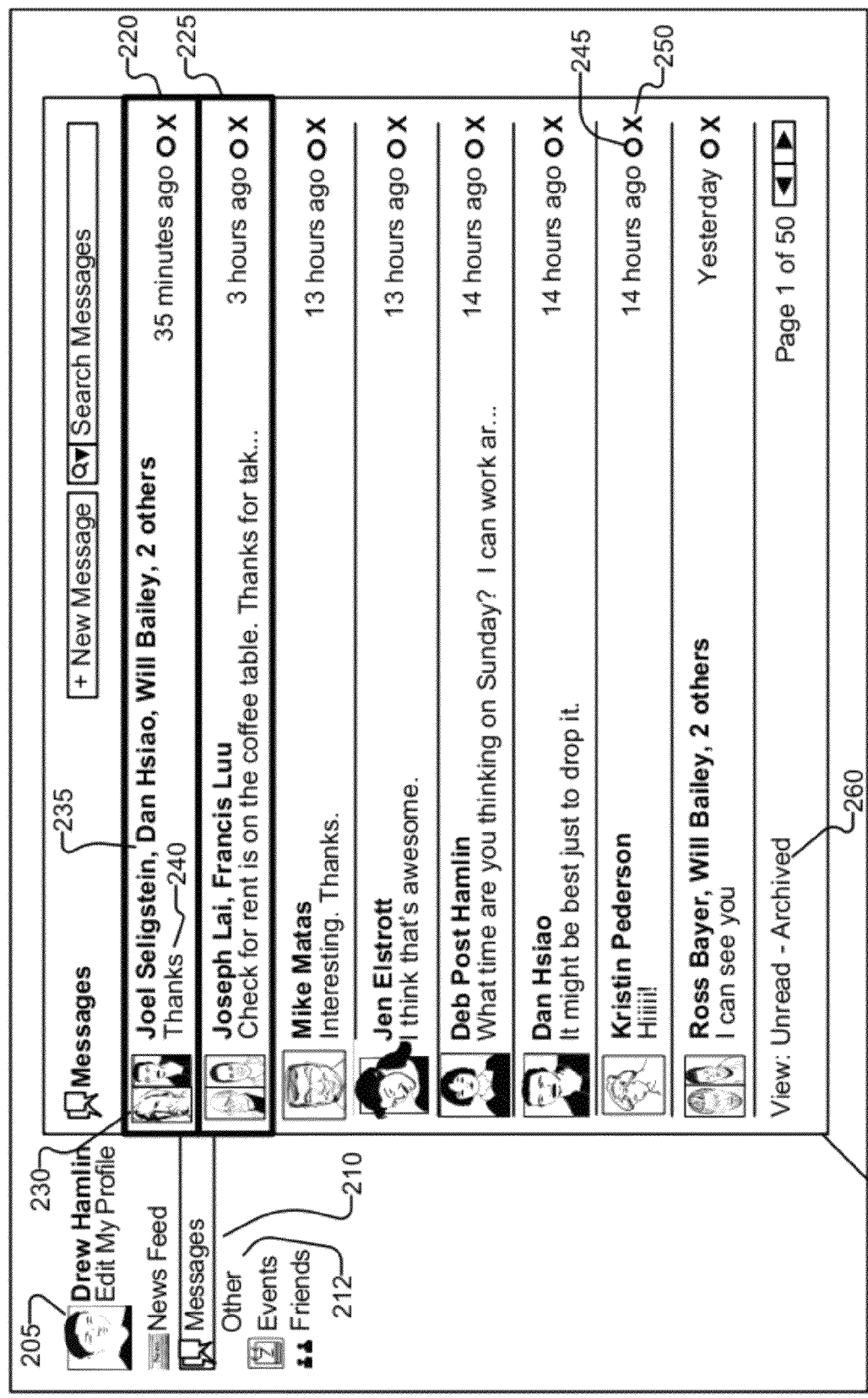
FIG. 2 is a message interface including a list of conversation threads, according to an embodiment.

Additionally, the mailbox module 170 may generate a message interface for the conversation threads that can be presented to a user of the messaging system. FIG. 2 is a message interface including a list of conversations according to an embodiment. The interface is for a user named Drew Hamlin 205. Drew has selected 210 to view his messages, which opens up a list 215 of conversation threads (e.g., 220 and 225). The first conversation thread 220 represents a conversation between six users - Drew Hamlin, Joel Seligstein, Dan Hsiao Will Bailey, and 2 others. The second conversation thread 225 represents a conversation between three users—Drew Hamlin, Joseph Lai, and Francis Luu.

For each conversation thread, a brief summary of the conversation is presented in the interface. In one embodiment, the summary includes the names 235 of the conversation participants, pictures 230 of the conversation participants, and an excerpt 240 from the most recent message in the conversation. The summaries are organized by time/date so that conversations with the most recent messages are placed higher in the interface. The name and/or picture of the user that the mailbox belongs to (the "mailbox owner") is not displayed in the summary because it is understood that the mailbox only includes conversations in which the mailbox owner is a participant. In this figure, Drew Hamlin 205 is the mailbox owner, so his name/picture are not shown in the summaries.

When a conversation thread has multiple participants, the names of each participant can be displayed in a summary. For example, in conversation 225, the names of users Joseph Lai and Francis Luu are displayed in the summary. In one embodiment, the object store 110 includes a profile for each user that comprises a profile name, an email address, a profile picture, and other identifying information. In one embodiment, the name of a participant as displayed in the summary is identified from the participant's profile. For example, an email received from Josephi.Lai@ yahoo.com can be identified from information in the object store 110 as being an email from the user Josephi Lai.

When a conversation thread has a large number of participants, in one embodiment only a sub-set of the participant names are presented to simplify the summary. The sub-set can be any number of participants from the conversation. For example, conversation 220 has six participants. Only the names of three conversation participants (Joel Seligstein, Dan Hsiao, and Will Bailey) are displayed. The name of the mailbox owner is not shown in the summary. The names of the other two participants are grouped together and presented as "2 others." The mailbox module 170 can select the sub-set of names in any of a number of ways. For example, the sub-set may include the names of the participants who created the most recent messages in the conversation, the name of the participant who started the conversation, or the names of the participants that the mailbox owner has the strongest affinity for or social relationship with.

When a conversation thread has multiple participants, the picture of each participant can be displayed in the summary. The picture of a participant can be identified from a participant's profile that is stored in the object store 110. However, when a conversation has a large number of participants, in one embodiment only a sub-set of the pictures are presented. For example, conversation 220 has six participants. Only the pictures for two participants are displayed using a split profile picture 230. The mailbox module 170 can select the sub-set of pictures for display in a manner that is similar to selecting the sub-set of names. For example, the sub-set may include the pictures of the participants who created the most recent messages in the conversation, the picture of the participant who started the conversation, or the pictures of the participants that the mailbox owner has the strongest affinity for or social relationship with. In one embodiment, the split profile picture 230 includes the pictures of the last two participants who replied to the conversation, excluding the mailbox owner.

In one embodiment, the brief excerpt 240 may be extracted from the content of the most recent message in the conversation thread. For example, in conversation 220, the excerpt 240 includes the text "Thanks," which is the most recent message from this conversation 220. In other embodiments, the brief excerpt is extracted from other information that is not message content, such as metadata associated with the message. For example, the brief excerpt could be the title of the most recent email message in the conversation.

Figure 3:
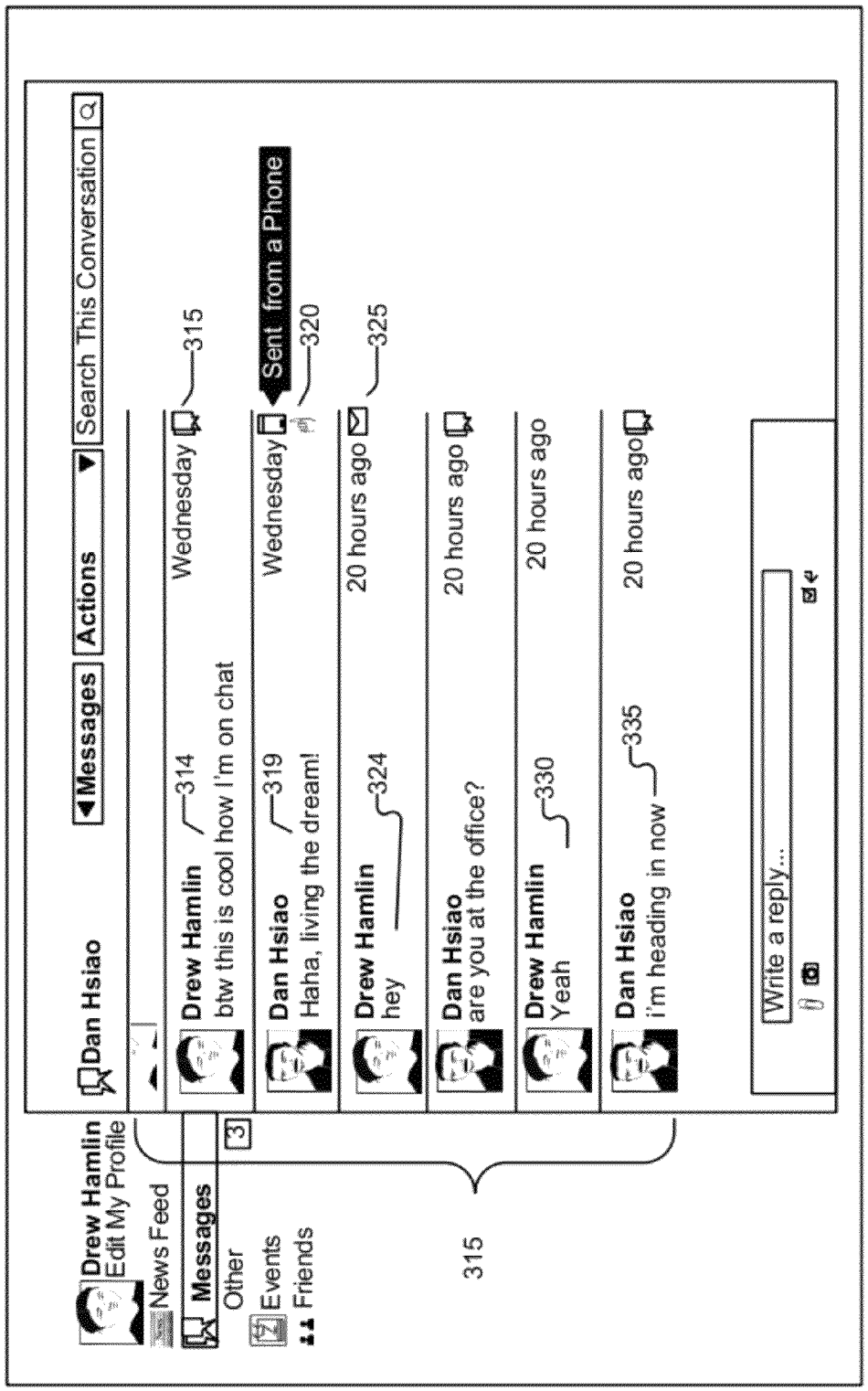
FIG. 3 is a message interface for a conversation thread that includes messages received via different messaging channels, according to an embodiment.

FIG. 3 is a message interface for a conversation thread that includes messages from different messaging channels, according to an embodiment. The user can reach this display by selecting one of the conversation threads in the interface of FIG. 2. Shown here is a one on one conversation between user Drew Hamlin and user Dan Hsiao that comprises of a series of messages 315 from different messaging channels that are presented in chronological order. Icons within each message indicate the message channel associated with the message channel that the message was delivered in. Icon 315 indicates that the first message 314 is a web-chat message. Icon 320 indicates that the second message 319 is a SMS text message sent from a phone. Icon 325 indicates that the third message 324 is an email message.

The conversation thread can be updated live as new messages are received that update the conversation thread. As discussed above, a conversation thread is akin to a historical record of correspondence between a set of users. Through the interface, a mailbox owner can scroll backwards in time to view the entire history of the messages in the conversation thread. In one embodiment, some of the messages can have attachments such as pictures, videos, documents, etc. The pictures and video can be shown in the interface with a preview of the attachment instead of just a link to the attachment. For example, an attached picture can be shown in the interface with a thumbnail of the picture.

The conversation thread also includes both outgoing and incoming messages. For example, the conversation thread in FIG. 3 includes message 330, which is a message sent by the mailbox owner Drew Hamlin. The conversation thread also includes message 335, which is a message sent to the mailbox owner from user Dan Hsiao.

Figure 4:
FIG. 4 is a message interface for a conversation thread between more than two users, according to an embodiment.

In one embodiment, conversation threads that have more than two participants behave like chat rooms. A conversation participant can send a message to the conversation thread, which is then distributed by the mailbox module 170 to all conversation participants. FIG. 4 is a conversation thread between more than two users according to an embodiment. As shown, this conversation thread involves Drew Hamlin 405, Tom Occhino 410, and 14 other users 415. Conversation thread participants can create new messages that update and add to the existing list of messages in the conversation thread in near real-time. Conversation thread participants can add new users to a conversation thread, which updates the conversation thread with an indication 425 that a user was added. Conversation thread participants can also leave the conversation thread, which updates the conversation thread with an indication 430 that a user has left. When a conversation thread is updated with a new message, it can also trigger a notification message that is sent to the participants of the conversation thread. A notification message can be sent via a number of different message channels (e.g., email, SMS, etc.).

Figure 5:
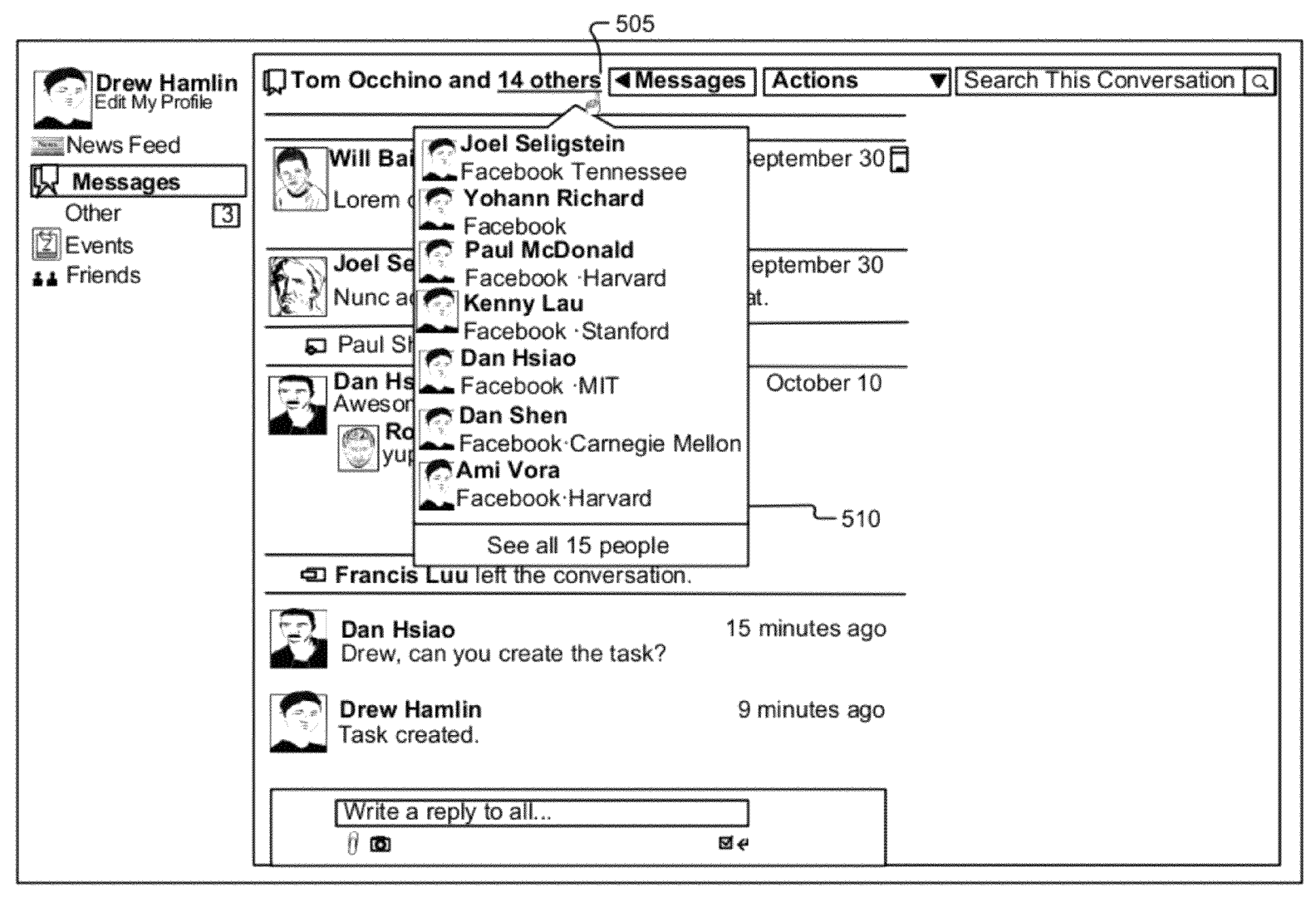

FIG. 5 is a message interface for a conversation thread between more than two users according to an embodiment. As shown, the mailbox owner has selected the text for the fourteen other participants 505 in the conversation thread. In response, a list of participants is displayed. Each participant is displayed along with a name, a picture, and other identifying information such as an employer and college. As the entire list of fourteen participants is too long to be displayed at once, only a sub-set of seven participants is presented in the interface.

Figure 6:
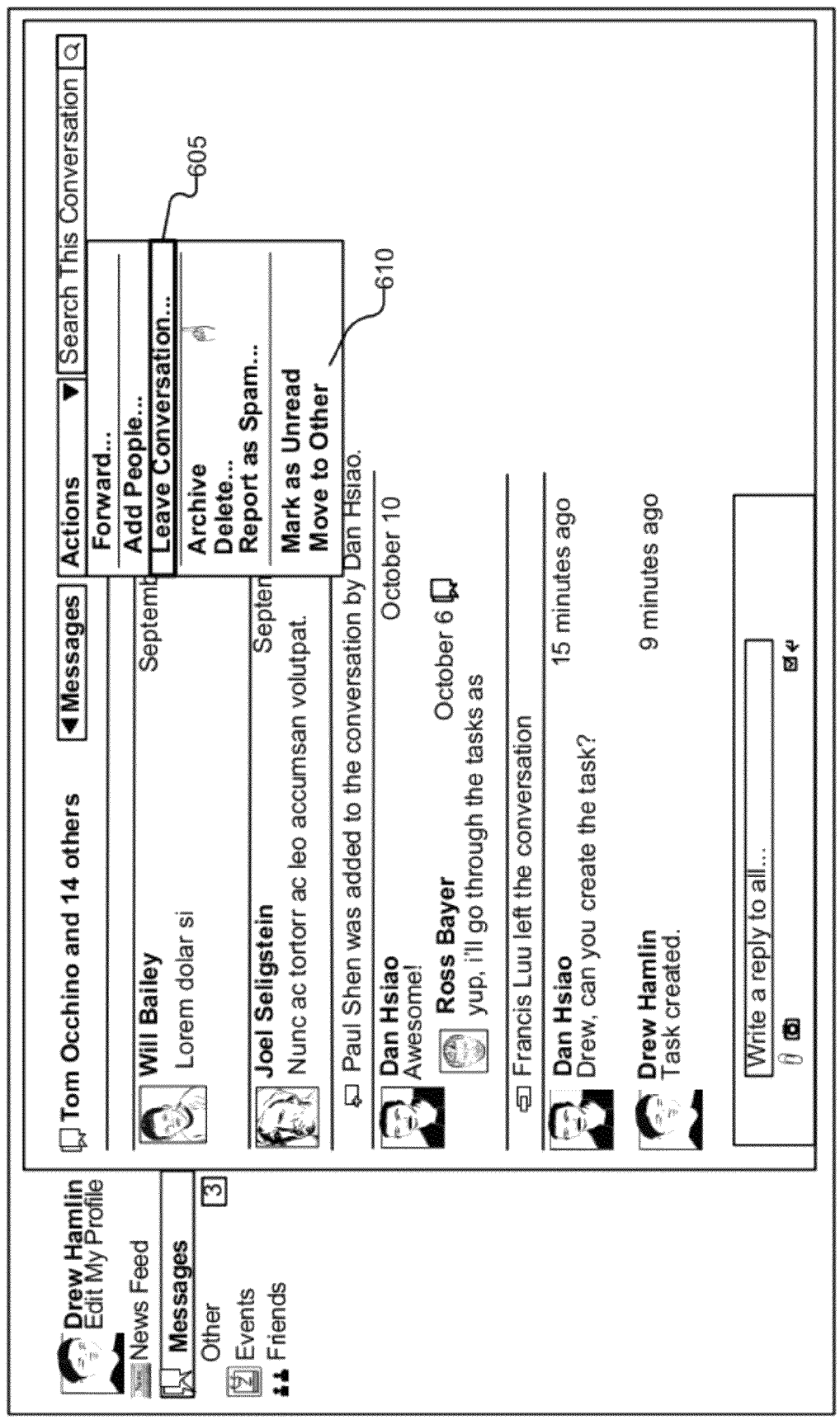
FIG. 6 is a message interface for a conversation thread between more than two users, according to an embodiment.

FIG. 6 is a message interface for a conversation thread between more than two users according to an embodiment. As shown, the mailbox owner has selected to leave 605 a conversation thread. Once the mailbox owner leaves a conversation thread, he/she no longer receives messages for that conversation thread. In one embodiment, leaving a conversation thread also changes the state of a conversation thread to "archived." States are explained by greater detail in conjunction with FIG. 17.

2. Multi Mode Message Reply Interface

Figure 7:
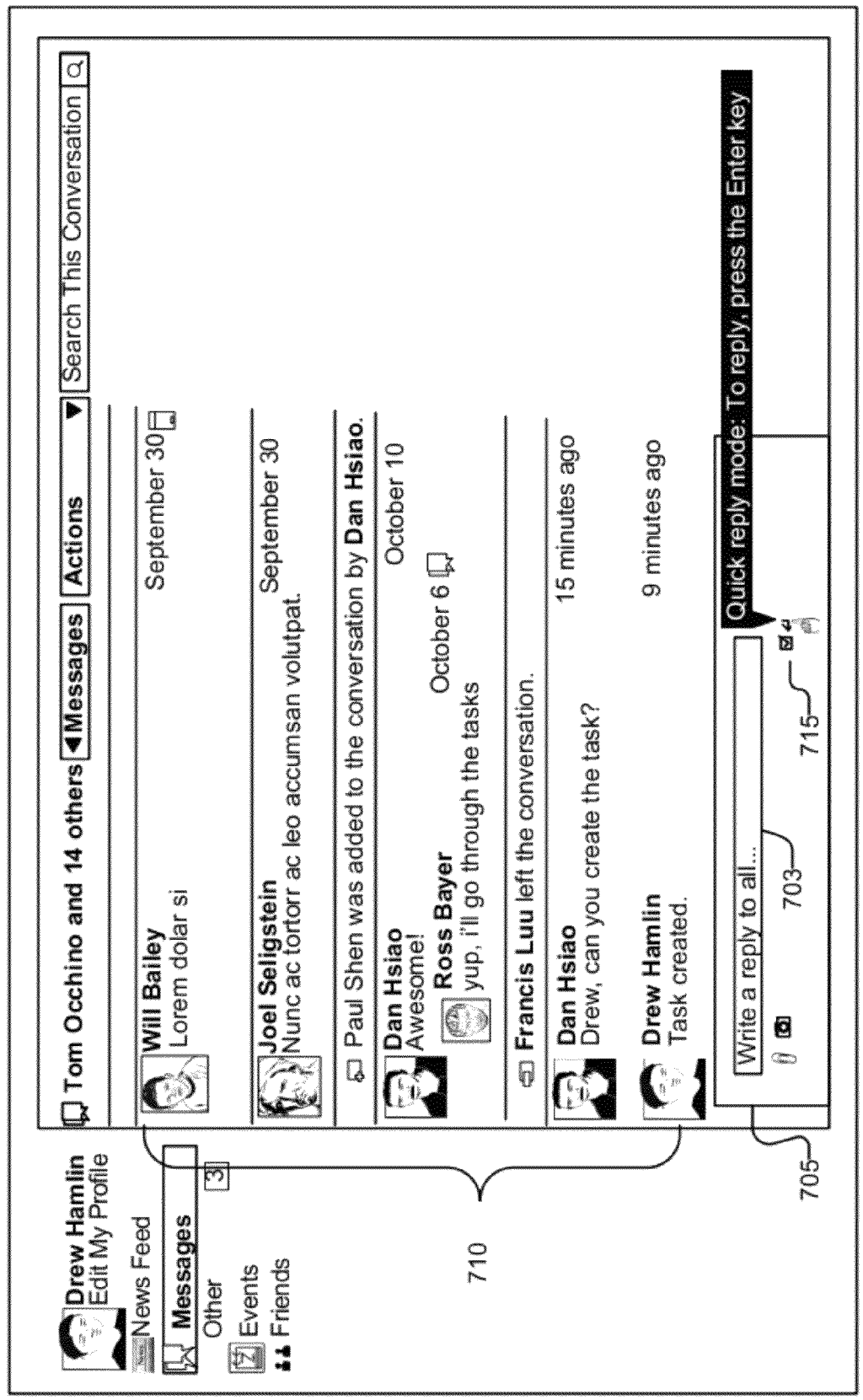
FIG. 7 is a message interface that includes a quick reply bar for sending messages according to an embodiment.
Figure 8:
FIG. 8 is a message interface that includes a quick reply bar for sending messages according to an embodiment.

FIGS. 7 and 8 illustrate a message interface that includes a quick reply bar 705 for sending messages according to an embodiment. The message interface includes several regions. One region of the message interface displays the messages 710 of a selected conversation thread. Another region of the interface includes a quick reply bar 705. The quick reply bar 705 is used for sending either text-based messages or attachments to participants of a conversation thread. As shown in FIG. 7, quick reply bar 705 is placed below a conversation thread at the bottom of the interface. In one embodiment, the quick reply bar 705 is placed anywhere in the interface and does not necessarily have to be placed directly below the conversation thread.

The quick reply bar 705 includes a text entry box 703 and a mode selection box 715. The text entry box 703 is an element of the interface that accepts message text for updating the conversation thread. The quick reply bar can operate in two different messaging modes: quick reply mode or standard mode. The mode can be selected by toggling the interactive mode selection box 715 in the quick reply bar 705. The interactive selection box 715 thus allows a user to switch between the quick reply mode and the standard mode or to select a particular mode of operation. In other embodiments, more than two message modes may be supported by the quick reply bar 705 and the mode selection box 715 may allow the user to switch between any of the modes. Additionally, in other embodiments the text entry box 703 and mode selection box 715 may have a different appearance than that shown in FIG. 7.

The quick reply mode is similar to an instant messaging mode for sending messages. When operating in quick reply mode, a user can enter a message in the text entry box 703 and send it by pressing the enter key. This allows for messages to be sent with keyboard-based input without requiring the user to switch between a keyboard and a mouse, allowing for a quicker reply. The message is sent to the mailbox module 170 that adds the message to the conversation thread and updates the message interface with the new message. Any message text in the text entry box 703 is also cleared out to allow the user to start typing a new message.

Referring to FIG. 8, when operating in non-quick reply (standard mode), a reply all button 810 is provided for sending messages. The reply all 810 button is an interface element that can be selected with a mouse click. In some embodiments, the reply all button 810 may only be shown when operating in the standard mode but hidden during the quick reply mode.

When operating in a non-quick reply (standard) mode, pressing the enter key does not send the message. Instead, pressing the enter key has the effect of generating a carriage return and moves the cursor below the current line of text in the text entry box 703, similar to how pressing the enter key when writing an email creates another line of text. This method of sending messages may be slower because it requires the use of a mouse, but is preferable for some users.

Additionally, this also allows for the creation of more complex and longer messages that have multiple lines of text and spaces in-between the lines.

In one embodiment, the settings for the quick reply bar 705 are persistent. As the mailbox owner moves from one conversation thread to the next, the settings for the quick reply bar 705 are maintained. For example, if the mailbox owner sets the quick reply bar 705 to a standard mode when viewing one conversation thread and then switches to viewing a different conversation thread, the quick reply bar 705 will remain in standard mode.

Figure 15:
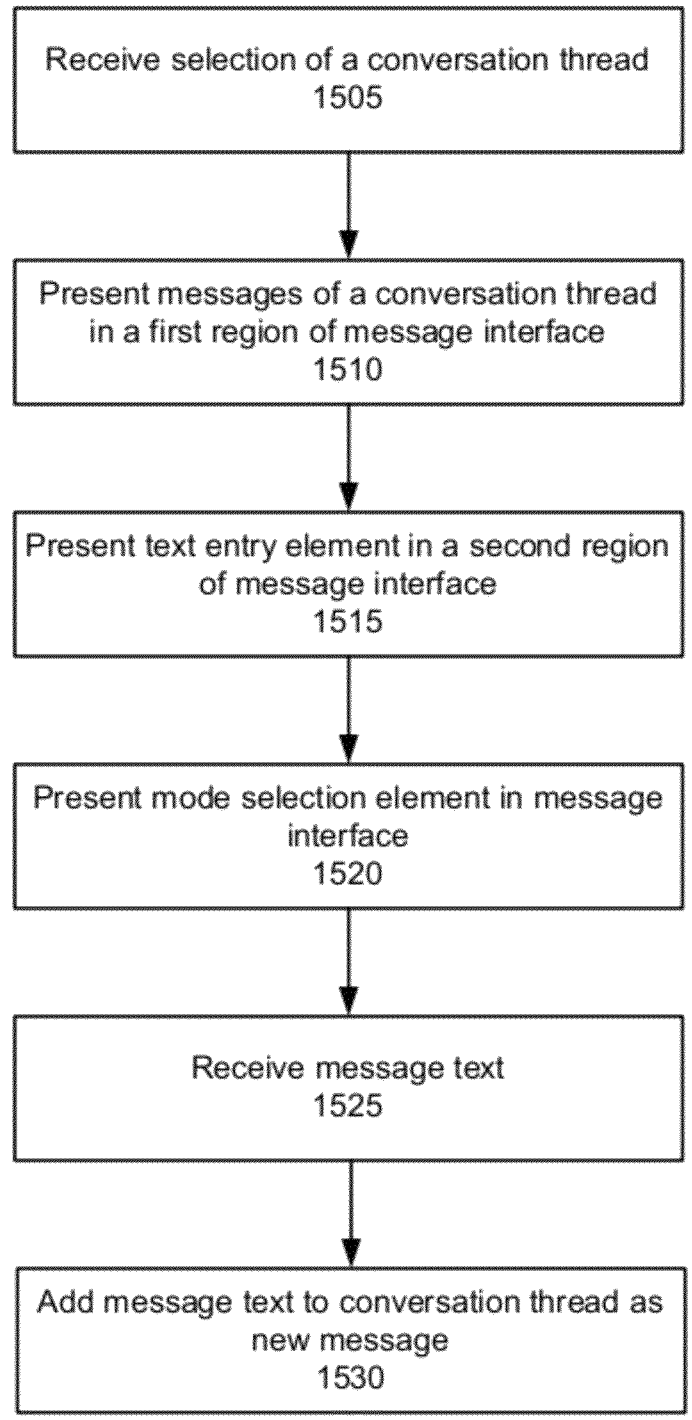
FIG. 15 is a method for operation of a multi-mode message reply interface with a quick reply bar, according to an embodiment of the mailbox module.

FIG. 15 is a method for operation of a multi-mode message reply interface with a quick reply bar, according to an embodiment of the mailbox module 170. In step 1505, the mailbox module 170 receives a selection of a conversation thread. The selection is received, for example, from a user viewing a list of conversation threads presented to the user. In step 1510, the mailbox module 170 presents the messages of the selected conversation thread in a first region of a message interface. In step 1515, the mailbox module 170 presents a text entry element (e.g., a text box 703) in a second region of the message interface. The text entry element is configured to accept message text entered by the user. In step 1520, the mailbox module 170 presents a mode selection element (e.g., a selection box 715) in the message interface, which can be used to switch the text entry element between different message modes.

The user enters message text into the text interface element and sends the message in one of the two supported message modes by selecting the appropriate mode using the mode selection element. If the quick reply mode is selected, a keyboard return input sends the message text in the text entry element as a message. If the standard reply mode is selected the keyboard return input operates as a carriage return that opens an additional line of text in the text entry element. As used herein, a keyboard return input refers to an input from any keyboard-type interface (e.g., physical keyboard or touch screen keyboard) that typically returns a cursor to a next line or executes a command. When operating in the standard reply mode, a message reply element (e.g. reply all button 810) may also be presented in the interface.

In step 1525, the mailbox module 170 receives the message text entered via the text entry element. In step 1530, the mailbox module 170 adds the message to the conversation thread presented in the first region of the interface. The mailbox module 170 also updates the message interface with the new message to indicate that the conversation has been updated with the new message.

3. Organizing Conversation Threads using Social Network Information

In one embodiment, the mailbox module 170 organizes conversation threads using social networking information from the graph information store 120. Social network information is indicative of social relationships between the users of a conversation thread and allows the conversation threads to be organized by their social relevancy. When a user has a large number of messages and conversation threads, organizing conversation threads using social networking information helps to avoid information overload.

In one embodiment, organizing includes categorizing conversation threads in a user's mailbox into different folders that reflect the perceived importance of the conversation thread. Referring back to FIG. 2, shown is a list of conversation threads organized into different folders. Important conversation threads can be placed into the "messages" 210 folder, less important conversation threads can be placed into an "other" 212 folder, and unimportant conversation threads can be placed into a "spam" folder (not shown). In FIG. 2, the messages folder 210 is selected, and so the conversation threads in the messages folder 210 are displayed in the primary window 215. In one embodiment, information about a folder that a conversation thread belongs to may be stored in the conversation thread index 172.

In one embodiment, the messaging module 170 applies a set of heuristic rules to place messages into the different folders. For example, one rule may be that if a certain type of social relationship (e.g., friends, family) exists between the participants of a thread, the conversation thread is placed into the messages 210 folder. Other types of social relationships are placed into the other 212 folder. If a social relationship does not exist at all, the conversation may be also be placed into the other 212 folder. Another rule may be that if an affinity between the thread participants exceeds a threshold, the message is placed into the message 210 folder. A further rule may be that if a distance (e.g. degrees of separation) between the participants is less than a threshold, the message is placed into the messages 210 folder. Variations on these rules are possible.

In other embodiments, the messaging module 170 can calculate relationship scores for the conversation threads as a function of the social information. For example, the relationship score may be calculated as a function of affinity such that a higher affinity results in a higher relationship score. Higher scores indicate that a thread is socially relevant, whereas lower scores indicate that a thread is less relevant. Threads with relationship scores exceeding a threshold are placed into the messages folder, threads with scores under a threshold are placed into the spam folder, and all other messages are placed into the other folder. In other embodiments, there may be a different number of conversation categories and the names of the categories may be different.

In other embodiments, organizing conversation threads includes sorting conversation threads according to social network information. For instance, conversation threads with a higher affinity may be placed in the message interface above conversation threads with a lower affinity, which indicates that the higher affinity threads are of greater social relevancy. The threads may be sorted according to heuristic rules, or by calculating a score for each conversation thread and sorting the threads according to their scores.

In yet another embodiment, organizing conversation threads includes filtering conversation threads according to social networking information. For instance, a user may select only to view conversation threads that involve "friends" of the user. In response, the mailbox module 17—presents only conversation threads where one or more participants of the thread are friends of the user. Other conversation threads not involving participants that are "friends" are hidden from view.

When a thread has more than two participants, the type of social information used to organize a thread may depend directly on which participant the thread is being presented to. For example, if user A, B and C are participants of a thread, the social relationship between user A and user B may be used to organize the thread for presentation to user A. Additionally or alternatively, the social relationship between user A and user C may also be used to organize the thread for presentation to user A. The social relationship between user B and user C may not be used to organize the thread for user A because that relationship is irrelevant to user A.

The mailbox module 170 may also consider other factors, either alone or in combination with the social information when organizing conversation threads. These factors include, but are not limited to:

- Whether any messages (e.g., emails) in the thread are signed, such as through Sender Policy Framework (SPF) or Domain Keys Identified Mail (DKIM).
- Whether any messages in the conversation thread contain a known virus.
- Whether any messages in the conversation thread contain known spam.
- Whether the conversation thread is initiated by a sender with a bad reputation. A sender may have a bad reputation if the sender has been blocked by other users of the social networking system 100.
- Whether the conversation thread is initiated by an object (e.g., user, page, event, or group) of the social networking system 100.
- Whether the conversation thread includes messages with attachments.
- Whether the conversation thread is initiated by an email address that the mailbox owner has white-listed or black-listed.

In one embodiment, once the mailbox module 170 categorizes conversation threads into folders, a user can override the default placement by selecting a new placement for any of the conversation threads. For example, referring back to FIG. 6, suppose the default placement for a particular conversation thread is in a "messages" folder. Through functionality provided in the user interface, such as an option 610 in a drop down list, the mailbox owner can select the conversation thread and move the conversation thread into the "other" folder. The settings are persistent so that the conversation thread remains in the "other" folder as new messages are received that update the conversation thread.

Figure 16:
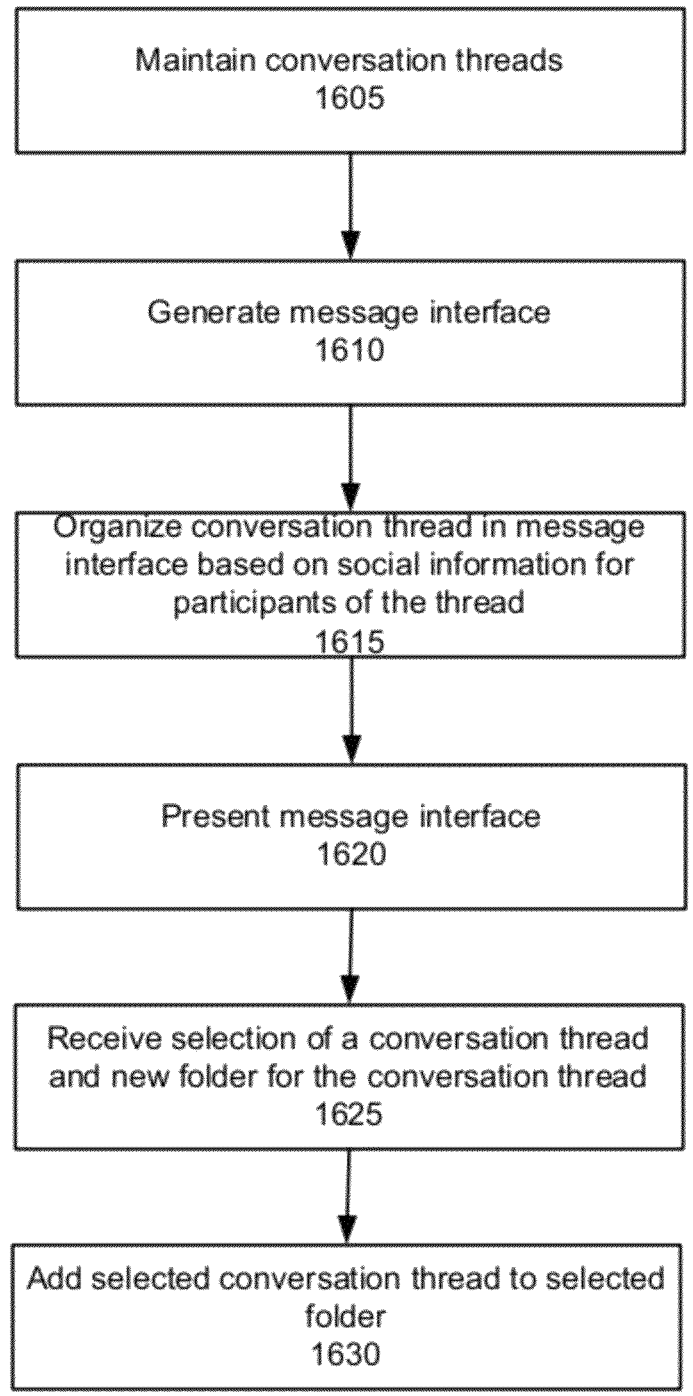
FIG. 16 is a method for organizing conversation threads based on social information, according to an embodiment of the mailbox module.

FIG. 16 is a flowchart of a method for organizing conversation threads based on social information, according to an embodiment. In step 1605, the mailbox module 170 maintains a plurality of conversation threads. Each conversation thread has a different set of participants and includes a collection of messages previously sent between the participants of the thread. For example, one thread may be for messages sent between user A and user B. Another thread may be for messages sent between user A and user C.

In step 1610, the mailbox module generates a message interface for viewing conversation threads, an example of which is shown in FIG. 2. The message interface has several different folders that grouping together conversation threads. The folders may be indicative of a relative importance of the conversation threads in the folder or some topic that is shared by the conversation threads in the folder.

In step 1615, the mailbox module 175 organizes the conversation thread in the message interface using social information that is indicative of relationships between the participants of the thread. The social information may be directly retrieved from the graph information store 120. Alternatively, it may be retrieved from a pre-built index of social information that allows for faster retrieval of the social information in the graph information store 120. In one embodiment, the mailbox module 175 organizes the conversation thread into a folder using the social information. In another embodiment, organizing may include sorting or filtering the conversation thread based on the social information.

In step 1620, the mailbox module 170 presents the message interface for display to a participant of the thread. The user may also select to over-ride the default folder assigned to a conversation thread by the mailbox module 175. In step 165, the mailbox module 170 receives a selection of a conversation thread from the user. The mailbox module 170 also receives a selection of a new category for the conversation thread from the user. In step 1630, the mailbox module then adds the conversation thread to the selected folder.

4. Conversation States and Archiving

In one embodiment, conversation threads have "states" that indicate the status of a conversation thread. Examples of states include whether a conversation thread is read, unread, or archived. In other embodiments, other states are also possible. States may be stored by the mailbox module 170 in the conversation thread index 172 as metadata associated with a conversation thread. As a conversation thread may have several participants, a separate state for the thread can be stored for each participant of a thread.

Figure 17:
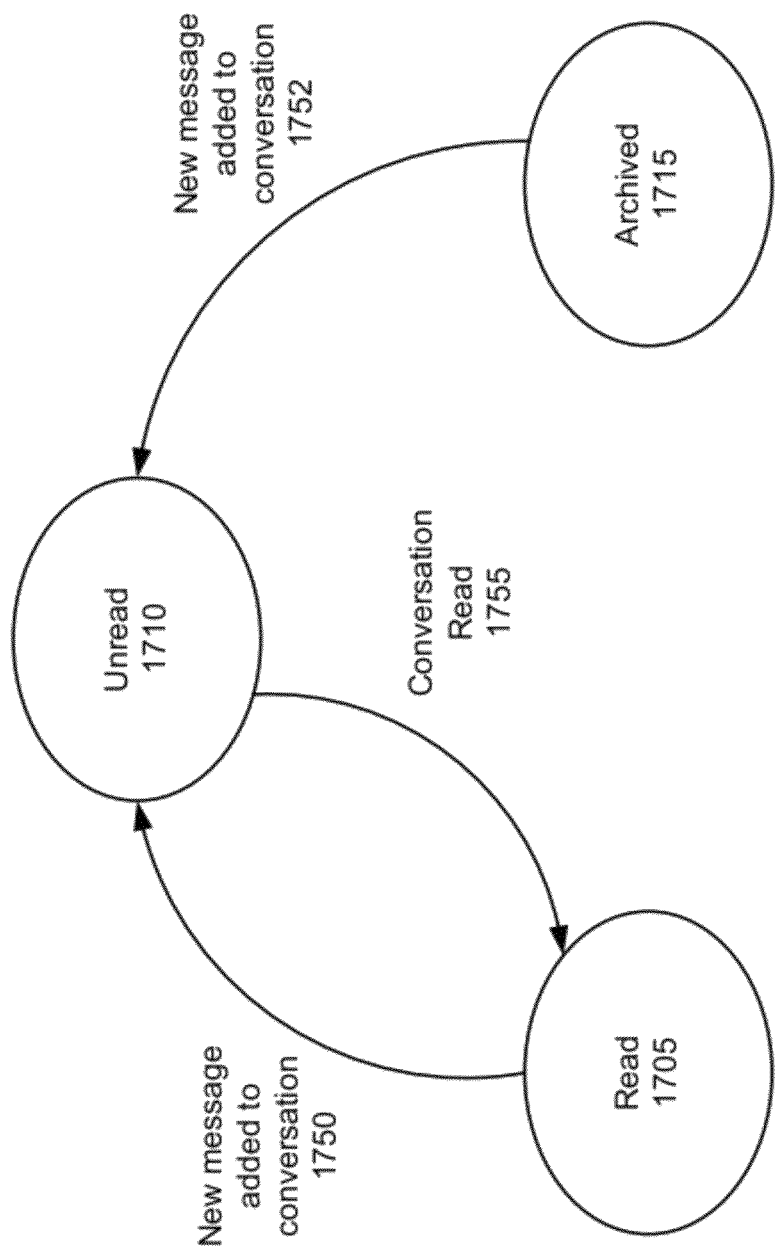
FIG. 17 is a state diagram for conversation threads, according to an embodiment.

FIG. 17 is a state diagram for conversation threads, according to an embodiment. Each of the conversation threads can be marked by the mailbox module 172 as being in the read state 1705, unread state 1710, or archived state 1715. The read state 1705 indicates that the messages in the conversation thread have already been read or acknowledged by the user. The unread state 1710 indicates that at least one message in the conversation thread has not yet been read by the user. The archived state 1715 indicates that user does not want to see the conversation thread, and so the conversation thread should be hidden from view when generating an interface that allows the user to view their conversation threads.

A conversation thread marked as being in the read state 1705 is updated to the unread state 1710 when a new message is received and added 1750 the conversation thread. A conversation thread marked as being in the archived state 1715 is also updated to the unread state 1710 when a new message is received and added 1752 to the conversation thread. A conversation thread marked as being in the unread state 1710 is updated to the read state 1705 when the mailbox module receives an indication that the user has read 1755 the new message of the conversation thread. Additionally, a user may manually select to change the state of a conversation from one state to a different state, which causes the mailbox module to update the state of the conversation in accordance with the user input.

Referring again to FIG. 2, shown is an interface where read and unread conversation threads within the messages 210 folder are presented in the interface. In one embodiment, the state of a conversation thread is used to determine how the conversation thread is presented in the message interface. For example, conversation threads in an unread state (e.g., threads 220 and 225) can be visually distinguished, e.g., highlighted with a purple color, to indicate that the conversation thread is unread. Conversation threads in a read state can be presented without any highlighting to indicate that the conversation thread is read. To simplify the appearance of the interface, archived conversation threads are hidden in the interface unless the mailbox owner specifies that the archived conversation thread should be shown. However, by selecting the Archived 260 button, the archived messages can be shown and all other messages can be hidden from view.

The state of a conversation thread can be automatically set by the mailbox module 170. A conversation thread is automatically marked as unread when new messages are received for the conversation thread. A conversation thread is automatically marked as read when the mailbox owner opens the conversation thread to read the messages in the conversation thread. The state of a conversation thread can also be set by the mailbox owner. Through the user interface, the mailbox owner can manually mark a conversation thread as being archived, read, or unread. For example, referring still to FIG. 2, a conversation thread can be marked as being read or unread with the o-shaped icon 245. A conversation thread can be marked as archived with the x-shaped icon 250. Both icons are selectable with a single mouse click to change the state of the conversation thread.

A conversation thread that is marked as unread or archived will maintain its state until a new message is received for the conversation thread. Once a new message is received, the mailbox module 170 marks the conversation thread as unread, even if the conversation thread was previously archived by the user. For archived conversation threads that were previously hidden from view, this has the effect of un-hiding the conversation thread and bringing it to the mailbox owner's attention. For example, a mailbox owner may archive a conversation thread for confirmation emails received from orders.amazon.com, indicating that he does not want to see this conversation thread. Archiving the conversation thread hides the conversation thread from view. However, once a new message is received from orders.amazon.com, the mailbox module 170 marks the entire conversation thread as unread. The conversation thread now appears in the user's mailbox to notify the mailbox owner that a new message was received.

5. Searching Messages and Conversation threads

Figure 9:
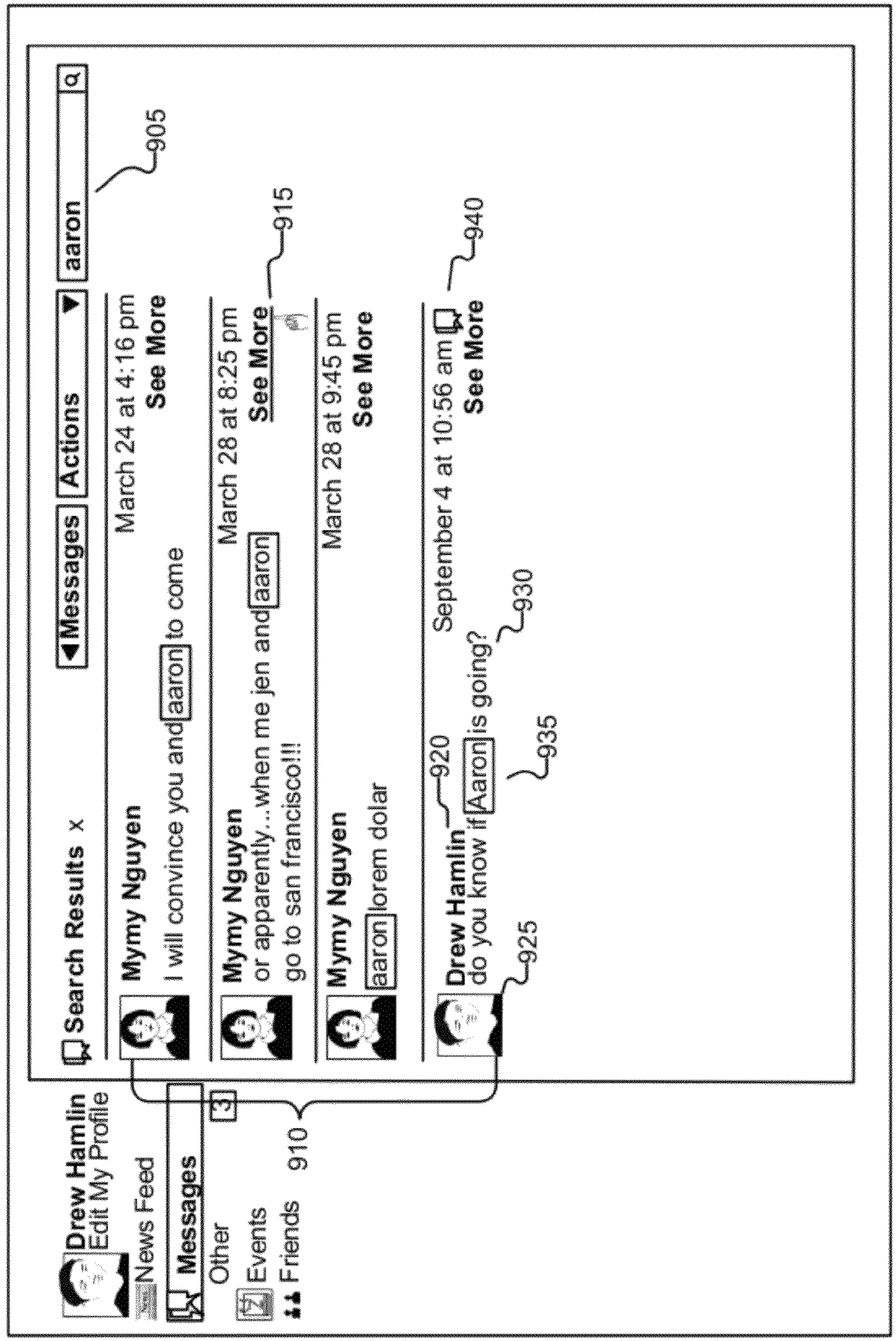
FIG. 9 is a message interface for searching for messages according to an embodiment.
Figure 10:
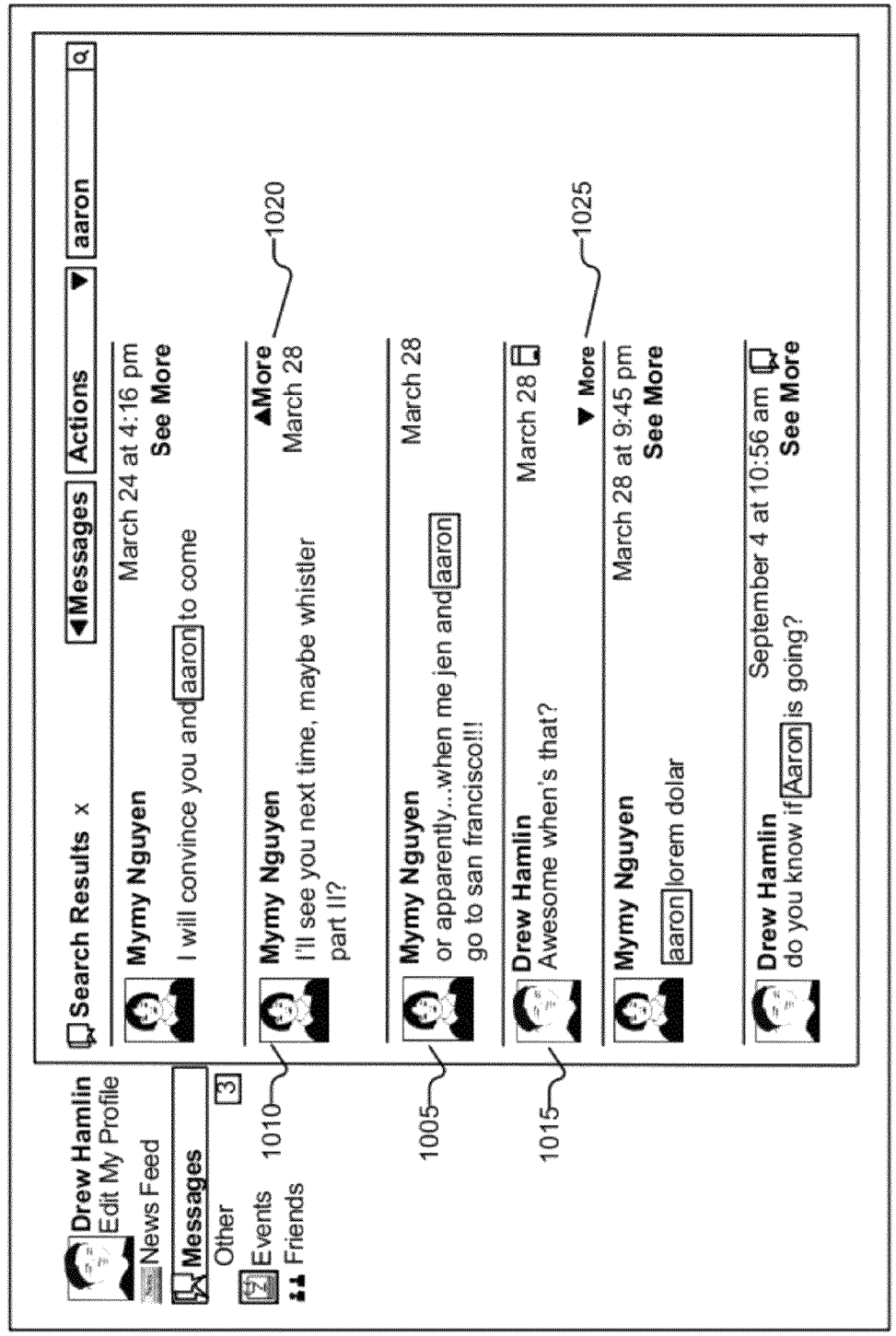
FIG. 10 is a message interface for searching for messages according to an embodiment.

FIGS. 9 and 10 illustrate an interface for searching for messages and conversation threads according to an embodiment. The interface allows messages to be searched through the use of textual search queries. Referring to FIG. 9, the mailbox owner has entered a query for "aaron" in a search box 905. The mailbox module 170 processes the query and identifies messages that match the query. The search results are then presented in a list 910 to the mailbox owner. For each search result, a summary of the search result is presented. The summary includes the name 920 of the user who sent the message, a picture 925 of the person who sent the message, the text 930 of the message itself, and a date and time 940 associated with the message. The text 930 of the message can be the entire message or a snippet of text from the message. The search string of "aaron" is highlighted in the message.

In one embodiment, the scope of the search can be limited through the use of search options. The search options can be entered in a number of ways, such as with an additional command in the search query or through a list of selectable options. Using the search options, the scope of the search can also be limited in a number of ways. For example, the search can be limited to particular conversation threads or can be an unrestricted search of a user's entire mailbox. Searches can also be restricted by time, user names, message channel (i.e., email or web-chat), etc.

In one embodiment, the interface also includes a "see more" button 915 that provides additional context for a select message, such as messages from the same conversation thread that are adjacent in time to the select message. Displaying additional context facilitates the mailbox owner's understanding of messages in the search results. Referring to FIG. 10, shown is the message interface after the mailbox owner has selected the see more button 915 from FIG. 9. As a result, the mailbox module 170 identifies and presents two additional messages 1010, 1015 are shown in the interface. One message 1010 is the preceding message from the same conversation thread as the original message 1005 and is presented directly above the original message 1005. Another message 1015 is the subsequent message from the same conversation thread as the original message 1005 and is presented directly below the original message 1015.

Additional messages from the conversation thread can be shown by selecting the "more" buttons 1020, 1025. One more button 1020 causes the mailbox module 170 to show additional preceding messages. The other more button 1025 causes the mailbox module 170 to show additional subsequent messages. The conversation thread can thus be expanded as much as necessary to provide the user with more information about the conversation thread that the selected message belongs to.

6. New Message Notification

In one embodiment, when a new message is received, the mailbox module 170 sends a notification to the mailbox owner. The notification can be delivered in a number of different ways, such as through a chat window, an email, a SMS message, a visual indication in a user interface, an application installed on a mobile device (e.g., IPHONE or ANDROID powered device), or any other method of delivering a notification. The notification may or may not contain the contents of the message itself For example, Adam may send an email intended for Bob that is received by the mailbox module 170 and updates the Adam-Bob conversation thread. To notify Bob of the new message, the mailbox module 170 can convert the contents of the email into an SMS message and forward the SMS message to Bob's phone number.

The mailbox module 170 considers the following policies in determining how to deliver the notification. In general, the mailbox module considers information such as social context, information about the message, information about the sender, and information about the recipient. The policies can be balanced against each other to determine the best method for sending a notification. Exemplary policies include:

- Activity indicating that the recipient has recently sent messages in a certain format. For example, if a recipient has recently sent a SMS message from a phone, it increases the likelihood that the notification will be a SMS message. If a recipient has recently sent a chat message, it increases the likelihood that the notification will be in a chat message.
- Past activity indicating that the recipient prefers a certain message format. For example, if a recipient has sent a high number of email messages in the past, it increases the likelihood that the notification will be an email.
- Whether the recipient is currently online and connected to the social networking system 100. For example, if a user is currently viewing content in the social networking system 100 through a web browser, the user can be notified of a message by changing the appearance of a message jewel (e.g., a visual icon) in the webpage being viewed by the user.
- Preferences set by the recipient. For example, the recipient can specify how notifications are delivered through options provided in a preferences window. The recipient may specify a preferred order of formats (i.e., email, SMS, IPHONE) by prioritizing different notification options or only allow notifications via certain formats.
- Preferences set by the sender. For example, when sending the message, the sender may be provided with an option to force a message into a certain format (i.e., email, SMS, IPHONE). This causes the message to be converted and sent via the selected format to the recipient. In one embodiment, the sender is provided with an option to send a message via SMS and optionally to enter the phone number of the recipient.
- The current time at the recipient's location. For example, if it is 3 AM at the recipient's location, it decreases the likelihood that the received message will be sent to the recipient's phone as a SMS message but may increase the likelihood that the notification will be sent via email.
- The mailbox folder that the message is placed in. For messages in less important folders, such as "spam" folders, it is less likely that the recipient will be notified of the message at all.

Format that the message was received in (email/chat/SMS/ etc). If a message is received in a certain format (e.g., email), it is more likely that the notification will also be delivered in the same format (e.g., email).

Whether recipient has provided his phone number to the social networking system 100. If a phone number is available, it increases the likelihood that the recipient will be notified with an SMS message.

The length of the message. Long messages are less likely to be forwarded to the recipient via a format that is designed to handle short messages, such as SMS and chat.

Whether there is an attachment in the message. Attachments are less likely to be forwarded to the recipient via a format that cannot handle attachments, such as SMS.

7. New User Experience Setup Bar

Figure 11:
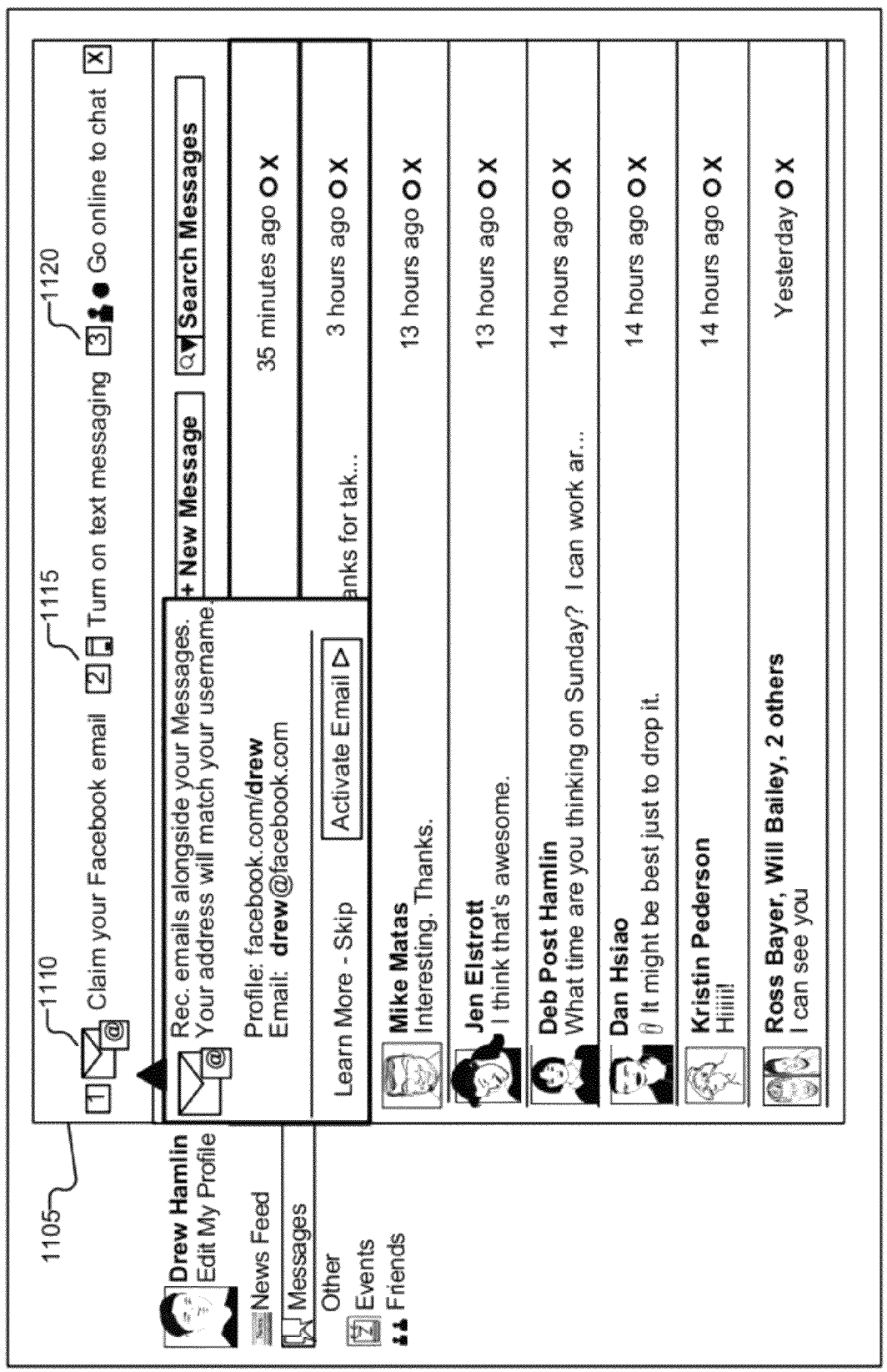
FIG. 11 is a message interface that includes a New User Interface (NUX) setup bar according to an embodiment.

FIG. 11 is a new user experience (NUX) setup bar according to an embodiment. The NUX bar allows a mailbox owner to configure messaging settings and facilitates adoption of the messaging system by new users. As shown, the NUX bar 1105 is near the top of the interface and can be selectively hidden from view.

In one embodiment, the NUX bar 1105 divided into three different interactive sections. One section 1110 is for activating an email address. Activating an email address enables the mailbox module 170 to send messages to the mailbox owner's email address. For example, in this figure, the mailbox owner has selected to activate the email address drew@ facebook. com. As a result of activating this email address, the mailbox owner may start receiving email messages, such as message notifications and other emails, at this email address.

A second section 1115 enables the mailbox owner to turn on SMS text messaging. Activating text messaging enables the mailbox module 170 to send messages, such as message notifications, to the mailbox owner's phone number. Selecting this option may open a separate window for entering a phone number, which is then received and stored by the mailbox module 170 in association with the mailbox owner.

A third section 1120 enables the mailbox owner to chat online. Selecting this option allows the user to start chatting online with other users in the social networking system 100. This feature allows users who are unfamiliar or uncomfortable with the design of the messaging interface to communicate with other users via a conventional chatting interface.

8. Adding Contextual Information to Messages

In one embodiment, message notifications sent by the message module 170 are formatted in a manner that is similar in appearance to the user interface of FIG. 10. The formatting allows the mailbox module to add additional contextual information to a message before sending the message to the recipient of a message. The contextual information can include, for example, recent messages from the conversation history, and profile pictures of the participants in the conversation.

Figure 18:
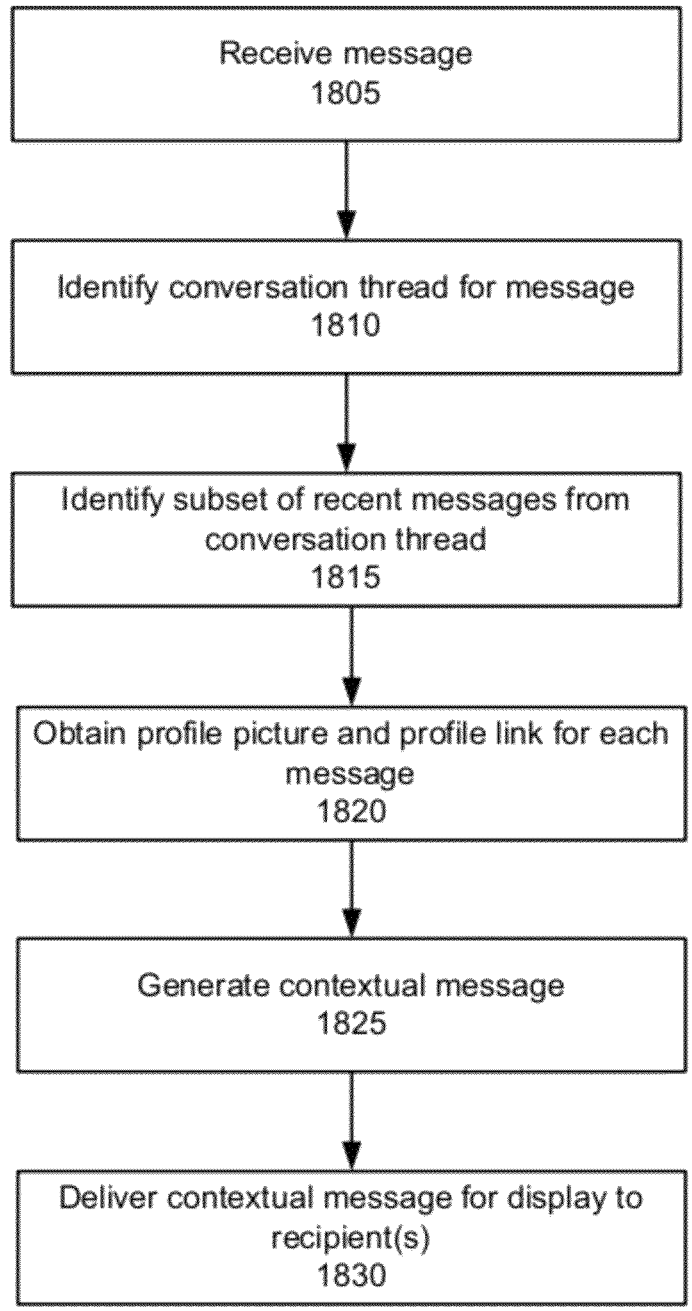
FIG. 18 is a method for adding contextual information to messages, according to an embodiment of the mailbox module.

FIG. 18 is a flowchart of a method for adding contextual information to messages, according to an embodiment of the mailbox module 170. In step 1805, the mailbox module 170 receives a message (e.g. an email) that is associated with users of the messaging system. In other words, the message has a sender and one or more recipients that are users of a messaging system.

In step 1810, the mailbox module 170 identifies a thread that the message belongs to. For example, the thread can be identified from the conversation thread index 172 by matching the participants of a thread to the sender and recipients of the message. Alternatively, the message may include an explicit indication of the conversation that it belongs to, which is used to identify the appropriate conversation. Generally speaking, by identifying the conversation thread, the mailbox module 170 is identifying a collection of messages previously sent between the participants of the thread.

In step 1815, the mailbox module 170 identifies a subset of one or more recent messages from the conversation thread. To reduce the amount of contextual information that is to be added to the message, the mailbox module 170 only selects the most recent messages in the conversation thread while excluding messages that are not recent (i.e., older messages). The number of messages in the subset can be set to any pre-determined number, or may be limited to messages that are within some pre-determined window of time. In one embodiment, recent messages are identified by identifying time-stamps of the messages in a thread and then selecting the messages with the most recent time-stamps.

In step 1820, the mailbox module 170 obtains a profile picture and profile link for both the received message and any messages in the subset of recent messages. For a given message, the user who sent the message is first identified. The user's profile picture is then obtained from the user's profile that is stored within the messaging system 100. Similarly, a link (e.g. a hyperlink) to the user's profile is also generated that can be used to access additional information about the user that sent the message.

For each message, the content of the message is also associated with its profile picture and profile link. Associating the content of the message with its profile picture/profile link allows a visual association to be created between the content of the message and its profile picture/profile link, which provides the user with an indication of who sent the message.

In step 1825, a contextual message (e.g., a message notification) is generated by organizing the received message and each message in the subset of recent messages in chronological order. Specifically, the content of each message and its associated profile picture and profile link are added to the contextual message such that they appear in chronological order. The appearance of the contextual message is explained in greater detail by reference to FIG. 12 and FIG. 13. In some embodiments, the profile link may be embedded into the picture such that selecting the profile picture accesses a user profile. In other embodiments, the profile link may be embedded into a name of a user who sent the message such that selecting the user's name accesses the user profile.

In step 1830, the mailbox module delivers the contextual message via one or more message channels (e.g., email) for display to one or more recipients of the original message. The notification may be delivered via the same message channel as the original message, or may be delivered through a different message channel. The recipient is thus provided with a notification of an incoming message that also includes additional context for understanding the message, such as a conversation history or profile pictures of the conversation participants.

FIG. 12 is an email message with added contextual information, according to an embodiment. This email includes messages of a conversation thread between Matthew Short and Drew Hamlin. The email includes a new message 1205 sent by Matthew Short that is represented by his name 1206, profile picture 1207, and the content 1208 of the message. Also included in the email are the most recent messages 1210 of the conversation thread that message 1205 belongs to. Each message in the set of recent messages 1210 is represented by the name of the participant who sent the message, the picture of the participant, the content of the message, and a date or time that the message was received.

The messages in the conversation history 1210 provide context for understanding the events leading up to the most recent message 1205. The profile pictures provide context for understanding which user sent each of the messages, and are placed just adjacent to the message content to create a visual link between the profile pictures and the message content. Additionally, the messages are organized in chronological order from most recent to least recent to represent the flow of the conversation. In other embodiments, the messages may be organized in a different chronological order, such as from least recent to most recent.

In one embodiment, the names (e.g. 1206) in the email are active links to the profile of the participant. For example, clicking on the name "Matthew Short" will pull up the profile of Matthew Short from the object store 110. Alternatively, the profile pictures (e.g. 1207) themselves may be active links to the user profiles. The message also includes a link 1220 to the conversation thread for viewing other messages of the conversation thread. Selecting the link opens a message interface, such as the interface shown in FIG. 3 or 4.

FIG. 13 is an email message with added contextual information, according to an embodiment. This email represents messages of a conversation thread with several participants 1305. The email includes the latest message 1310 in the conversation thread, which is a message sent by Joey Flynn. The message 1310 includes Joey's name, profile picture, and the contents of the message. Also included in the email is a list of recent messages 1315 of the conversation thread. Each message in the set of recent messages 1315 includes the name of the user who sent the message, the profile picture of the user, the contents of the message, and a date or time the message was received. The message also includes a link 1320 to the conversation thread for viewing other messages of the conversation thread. Selecting the link opens a message interface, such as the interface shown in FIG. 3 or 4.

9. Forwarding Messages Between Conversation Threads

In one embodiment, the message module 170 allows the user to forward messages from one conversation thread to a different conversation thread (the "target conversation thread"). Messages can be forwarded through options provided by the user interface, such as with selection boxes that are placed next to each message. Using the selection boxes, one or more messages within a conversation thread can be selected for forwarding. Entire conversation threads can also be forwarded to a target conversation thread in a similar manner through options provided by the user interface. For example user Adam can forward the entire Adam-Bob conversation thread to the Adam-Bob-Charles conversation thread.

Figure 19:
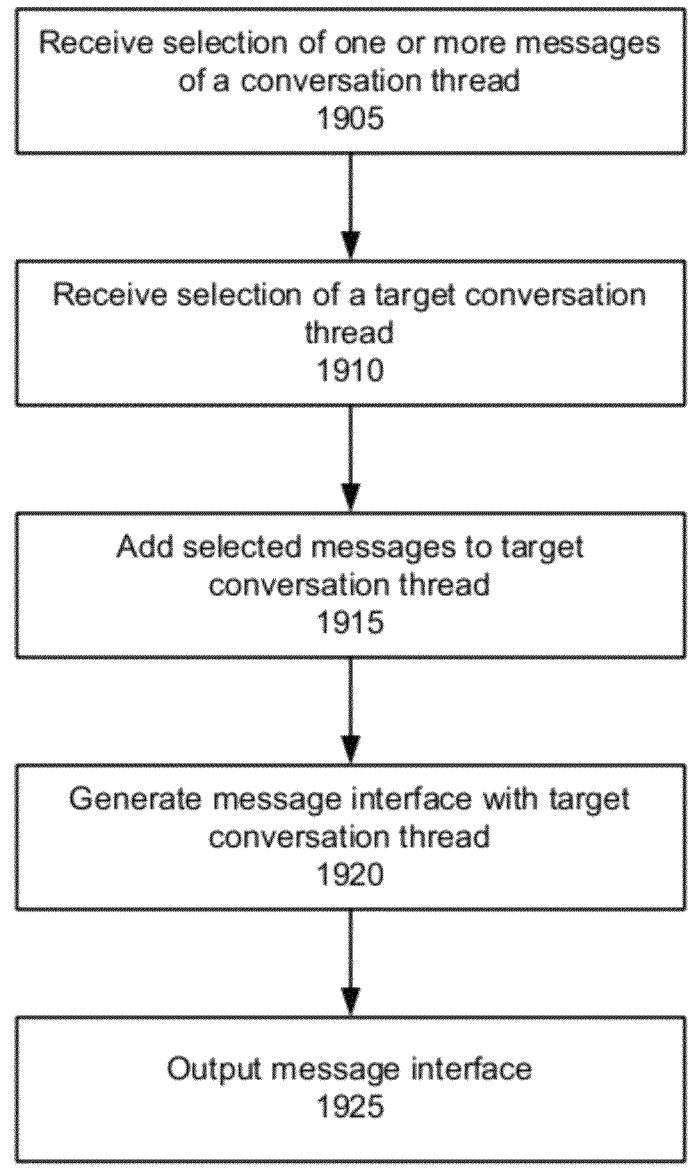
FIG. 19 is a method for forwarding messages between conversation threads, according to an embodiment of the mailbox module.

FIG. 19 is a flowchart of a method for forwarding messages between conversation threads, according to an embodiment of the mailbox module 170. In step 1905, a selection of one or more messages of a conversation thread is received. For example, the selection may be received from a client device 180 that selects one or more messages for forwarding to another conversation thread. In step 1910, a selection of a target conversation thread is received. For example, the selection may also be received from a client device 180.

In step 1915, the mailbox module 170 adds the selected messages to the target conversation thread. The mailbox module 170 may also add additional information to the conversation thread index for the forwarded messages. Examples of information that may be added to the index include whether the messages were forwarded, the user who forwarded the messages, when the messages were forwarded, etc.

In step 1920, the mailbox module generates a message interface for the target conversation thread. In one embodiment, the message interface may have the appearance shown in FIG. 4 or 5. In step 1925, the message interface is then output to the client device for display to a user of the messaging system.

Referring back to FIG. 4, as shown, user Dan Hsiao has forwarded a single message 430 from user Ross Bayer to this target conversation thread. The forwarded message 430 appears in the target conversation thread with the full text of the forwarded message, the name of the original sender (Ross Bayer) of the message, the picture of the original sender, and the date (October 6) the message was sent. The message is also displayed with an indication of the participant who forwarded the message (Dan Hsiao) and the date the message was forwarded to the target conversation thread (October 10). In one embodiment, if Dan Hsiao had forwarded multiple messages from Ross Bayer at once, each of the forwarded messages would appear below message 430 as a list of messages.

In one embodiment, the forwarded messages are grouped together and appear as an attachment in the target conversation thread. In another embodiment, the messages are combined into one large message, assigned a timestamp based on the date the messages were forwarded, and appear as a single message within the new conversation thread. For example, if the messages "Thank you" and "I like Halloween candy" are forwarded as a group, they would appear as a single message of "Thank you. I like Halloween candy." within the target conversation thread. In yet another embodiment, forwarded messages are integrated into the target conversation thread using their original timestamps. This in essence updates the target conversation thread with new messages, making messages appear as if they were always part of the target conversation thread.

10. Invitation-Based Features

In one embodiment, the messaging system contains a large number of messages 119 that are not organized into conversation threads. To achieve the benefits of conversation threading, the mailbox module 170 must organize these messages 119 into conversation threads. However, this can be a challenge for messaging systems that have millions of users and multiple-petabytes of data.

To facilitate a smooth transition from a messaging system that is not conversation-based into a messaging system that is conversation-based, the mailbox module 170 selectively invites users to convert their messages into a conversation-based format. Inviting users comprises any action that, if accepted, initiates the conversion and does not have to be an explicit invitation for conversion. For example, in one embodiment an invitation comprises inviting a user to sign up for an email address. When the request is accepted, the mailbox module 170 then begins the conversion for that user. Furthermore, invitations may be sent in a variety of manners, such as via email, through a notification when the user logs on to the messaging system, etc.

In one embodiment, a sub-set of users is first invited to initiate the conversion process. The sub-set of users includes the most frequent users of the messaging system, as indicated by a user's actions within the messaging system 100. For example, actions can include messages sent or messages received. If the messaging system includes a social networking system, the actions may also include, for example, number of friends, time spent browsing content in the social networking system 100, number of objects interacted with in the social networking system, etc. Other types of social information may also be used to determine the most frequent users. In one embodiment, an activity score is computed for the users as a function of such activity information, and users with scores exceeding a threshold are considered the frequent users. Frequent users are invited to initiate the process, whereas other users are not.

In one embodiment, frequent users are also given a limited number of invitations to distribute to other users. The number of invitations to be given to a user can be determined in any manner. For example, a user may be given just enough invitations to cover all the user's friends. In one embodiment, any users that accept an invitation are given invitations to distribute to other users. In another embodiment, there may be a pre-determined amount of time that passes between when a user accepts an invitation and when the user is given additional invitations to distribute. The process continues until all the users in the messaging system have their mailboxes migrated into conversation-based mailboxes or until the need for sending invitations is no longer necessary.

Generally speaking, invitations may be provided for initiating any type of feature provided by the messaging system, and not just for initiating conversation-based messaging. For example, if the messaging system includes a social networking system, the invitations may be for initiating the use of a new social networking feature, the use of a new social networking application, or the use of a new social networking interface.

Figure 20:
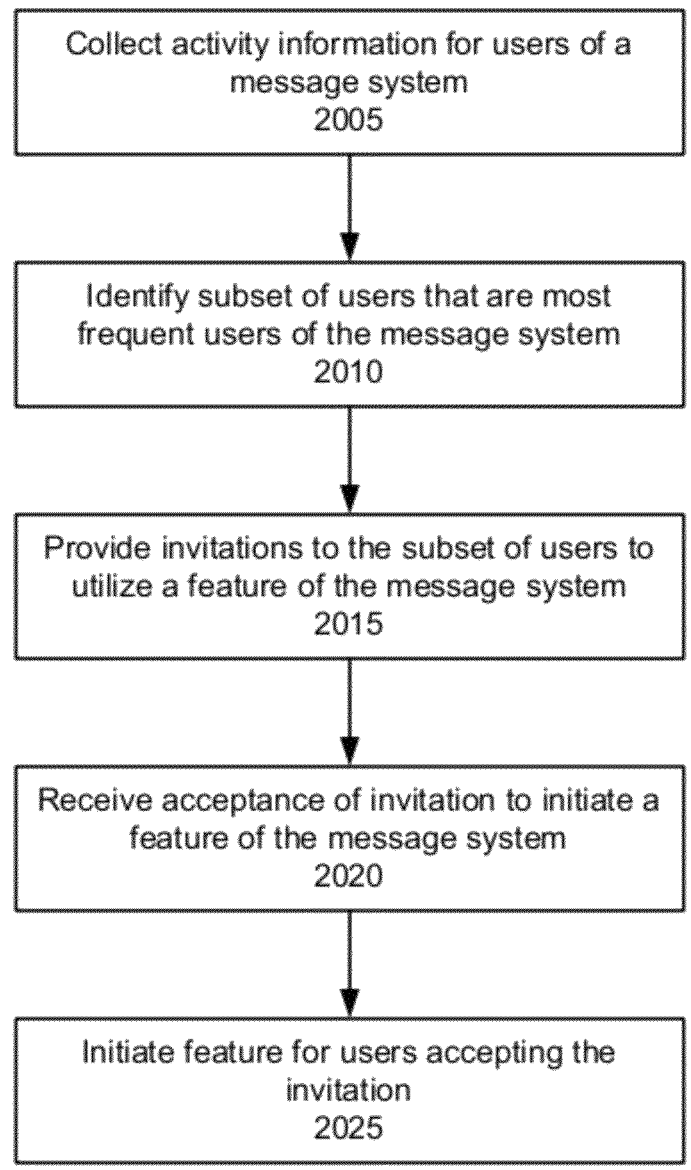
FIG. 20 is a method for invitation based initiation of a feature provided by a messaging system, according to an embodiment of the mailbox module.

FIG. 20 is a flowchart of a method for invitation based initiation of a feature provided by a messaging system, according to an embodiment of the mailbox module 170. In step 2005, activity information that is indicative of users' activity levels is collected for the users of a messaging system. In step 2010, a subset of users is identified that are the most frequent users of the messaging system based on the activity information. In step 2015, invitations are provided to the subset of users to utilize a feature provided by the messaging system. The feature may be the use of a conversation-based message system, or some other feature provided the messaging system. In step 2020, one or more users accept the invitation and the acceptance is received by the mailbox module 170. In step 2025, the feature is initiated for the users that accepted the invitation.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by a social networking system, a first message corresponding to a first electronic message channel, the first message associated with a first set of users of the social networking system, the first electronic message channel being one of email, chat, extensible messaging and presence protocol or short message service;
adding the first message to a first conversation thread that is associated with the first set of users and includes a collection of messages sent between the first set of users;
receiving, by the social networking system, a second message corresponding to a second electronic message channel that is different than the first electronic message channel, the second message also associated with the first set of users, the second electronic message channel being one of email, chat, extensible messaging and presence protocol or short message service;
adding the second message to the first conversation thread associated with the first set of users;
accessing information about at least one social relationship in the social networking system between the first set of users associated with the first conversation thread;
selecting a subset of the first set of users based on the information about the at least one social relationship;
generating a first summary of the first conversation thread, the first summary including an excerpt from the first conversation thread, names of the selected subset of the first set of users, and profile pictures of the selected subset of the first set of users that are identified from profiles of the selected subset of the first set of users;
generating a second summary of a second conversation thread, the second summary including an excerpt from the second conversation thread, one or more names of one or more users from a second set of users associated with the second conversation thread, and one or more profile pictures of the one or more users from the second set of users that are identified from one or more profiles of the one or more users from the second set of users;

generating a conversation thread list that includes the first summary of the first conversation thread and the second summary of the second conversation thread; and responsive to receiving a user selection of the first summary in the conversation thread list, generating a message interface corresponding to the first conversation thread for display to a user of the first set of users, the message interface including:
- content of the first message in association with an icon representing the first electronic message channel; and
- content of the second message in association with an icon representing the second electronic message channel.

2. The method of claim 1, wherein the first set of users includes two or more users of the social networking system and the first conversation thread is associated with the two or more users.

3. The method of claim 1, wherein the first set of users includes three or more users of the social networking system and the first conversation thread is associated with the three or more users.

4. The method of claim 1, wherein the first conversation thread associated with the first set of users includes a collection of all messages sent between the first set of users via the social networking system.

5. The method of claim 1, wherein the first conversation thread associated with the first set of users includes a collection of less than all messages sent between the first set of users via the social networking system.

6. The method of claim 1, wherein the first and second messages are both sent by a single user of the first set of users.

7. The method of claim 1, wherein the first and second messages are sent by different users of the first set of users.

8. The method of claim 1, wherein the first message channel is email and the second message channel is not email.

9. The method of claim 1, wherein the message interface includes:
- the content of the first message in association with a profile picture of a user of the first set of users that sent the first message; and
- the content of the second message in association with a profile picture of a user of the first set of users that sent the second message.

10. The method of claim 1, wherein the message interface includes a plurality of messages of the first conversation thread in chronological order.

11. The method of claim 1, wherein the first summary of the first conversation thread further comprises an indication of a number of users from the first set of users whose names are not included in the first summary of the first conversation thread.

12. The method of claim 1, wherein the one or more names in the first summary of the first conversation thread are selected based on at least one social affinity in the social networking system between the first set of users.

\* \* \* \* \*